United States Patent
Li et al.

(10) Patent No.: US 11,892,138 B2
(45) Date of Patent: Feb. 6, 2024

(54) VEHICLE HEADLAMP OPTICAL SYSTEM, VEHICLE HEADLAMP, AND VEHICLE

(71) Applicant: HASCO VISION TECHNOLOGY CO., LTD., Shanghai (CN)

(72) Inventors: Cong Li, Shanghai (CN); Zhiping Qiu, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/024,558

(22) PCT Filed: May 25, 2021

(86) PCT No.: PCT/CN2021/095829
§ 371 (c)(1),
(2) Date: Mar. 3, 2023

(87) PCT Pub. No.: WO2022/052511
PCT Pub. Date: Mar. 17, 2022

(65) Prior Publication Data
US 2023/0324023 A1    Oct. 12, 2023

(30) Foreign Application Priority Data
Sep. 8, 2020 (CN) .......................... 202010936996.2

(51) Int. Cl.
*F21S 41/27* (2018.01)
*F21S 41/147* (2018.01)
(Continued)

(52) U.S. Cl.
CPC ............. *F21S 41/27* (2018.01); *F21S 41/147* (2018.01); *F21S 41/151* (2018.01); *F21S 45/47* (2018.01); *F21W 2102/13* (2018.01)

(58) Field of Classification Search
CPC ........ F21S 41/147; F21S 41/151; F21S 41/27; F21S 45/47; F21W 2102/13
See application file for complete search history.

(56) References Cited

U.S. PATENT DOCUMENTS 10,288,252 B2 * 5/2019 Yasuda ................... F21S 41/39
11,156,333 B2 * 10/2021 Gromfeld ............... F21S 41/43
(Continued)

FOREIGN PATENT DOCUMENTS

| CN | 110329142 A | 10/2019 |
|---|---|---|
| CN | 210398742 U | 4/2020 |

(Continued)

*Primary Examiner* — Thomas M Sember
(74) *Attorney, Agent, or Firm* — Volpe Koenig

(57) ABSTRACT

A vehicle headlamp optical system, a vehicle headlamp, and a vehicle. The vehicle headlamp optical system comprises a plurality of modules and a light distribution lens that is disposed in front of each module. The plurality of modules comprise at least one high-beam module, at least one main low-beam module, and at least one auxiliary low-beam module. The light distribution lenses are narrow, long light distribution lenses. Each module is disposed at an interval along the length direction of the light distribution lenses. Thus, the miniaturization and diversified design of a vehicle headlamp can be achieved.

20 Claims, 18 Drawing Sheets

(51) Int. Cl.
   *F21S 45/47*     (2018.01)
   *F21S 41/151*    (2018.01)
   *F21W 102/13*    (2018.01)

(56) References Cited

U.S. PATENT DOCUMENTS

| | | | |
|---|---|---|---|
| 2015/0043236 A1* | 2/2015 | Yamamoto | F21S 43/19 |
| | | | 362/516 |
| 2015/0043238 A1* | 2/2015 | Yamamoto | F21S 41/151 |
| | | | 362/517 |
| 2017/0030543 A1* | 2/2017 | Gromfeld | F21S 41/322 |
| 2018/0187851 A1* | 7/2018 | Hossfeld | F21S 41/365 |
| 2022/0003375 A1* | 1/2022 | Sugiyama | F21S 41/663 |
| 2022/0136671 A1* | 5/2022 | Zhu | F21S 41/143 |
| | | | 362/520 |

FOREIGN PATENT DOCUMENTS

| | | |
|---|---|---|
| CN | 210637967 U | 5/2020 |
| CN | 111412426 A | 7/2020 |
| CN | 211203911 U | 8/2020 |
| CN | 112797368 A | 5/2021 |
| KR | 20200079862 A | 7/2020 |

* cited by examiner ated on Sep. 8,ion No. 202010936996.2, filed on Sep. 8,
VEHICLE HEADLAMP OPTICAL SYSTEM, VEHICLE HEADLAMP, AND VEHICLE

CROSS REFERENCE TO RELATED APPLICATIONS

This application is a 35 U.S.C. § 371 national stage of International Application No. PCT/CN2021/095829, which was filed May 25, 2021 and claims the benefit of Chinese patent application No. 202010936996.2, filed on Sep. 8, 2020, both of which are incorporated by reference herein as if fully set forth.

FIELD OF THE INVENTION

The present disclosure relates to a vehicle lamp, and specifically relates to a vehicle headlamp optical system. Furthermore, the present disclosure further relates to a vehicle headlamp and a vehicle.

BACKGROUND OF THE INVENTION

At present, a vehicle lamp has more and more tended to miniaturization and design diversification. However, there are mainly two ways including a lens and a reflecting mirror for achieving a high beam and a low beam in an existing vehicle headlamp optical system. Due to a limitation from the size of the lens or the reflecting mirror, it is very difficult to reduce the sizes of vertical openings of light outlets for light output of high-beam and low-beam modules of a vehicle lamp, which limits the miniaturization and diversified design of the vehicle lamp.

In addition, the vehicle lamp needs to be dimmed. Since the vehicle lamp has more and more tended to miniaturization, the design space is smaller and smaller, which causes interference between a traditional dimming mechanism and a housing of the vehicle lamp, so that dimming cannot be achieved, the layout of a part of parts is affected, and meanwhile, greater limitations are also caused to the design of the vehicle lamp.

SUMMARY OF THE INVENTION

A technical problem to be solved in a first aspect of the present disclosure is to provide a vehicle headlamp optical system by which the miniaturization and diversified design of a vehicle headlamp can be achieved.

A technical problem to be solved in a second aspect of the present disclosure is to provide a vehicle headlamp by which the miniaturization and diversified design can be achieved.

A technical problem to be solved in a third aspect of the present disclosure is to provide a vehicle by which the diversified design can be achieved and which is beneficial to the improvement of the overall visual effect and aesthetic degree.

In order to solve the above-mentioned technical problems, a first aspect of the present disclosure provides a vehicle headlamp optical system including a plurality of modules and light distribution lenses that are disposed in fronts of all the modules; the plurality of modules including at least one high-beam module, at least one main low-beam module, and at least one auxiliary low-beam module; the light distribution lenses being narrow and long light distribution lenses; all the modules being disposed at intervals along the length directions of the light distribution lenses; the high-beam module including a high-beam optical element and at least one high-beam light source, the high-beam optical element including a high-beam light transmission part and a light emitting part, at least one high-beam light converging part being disposed on a rear end of the high-beam light transmission part, the high-beam light converging part, the high-beam light transmission part and the light emitting part being sequentially connected and being integrally formed, the high-beam light converging part being in one-to-one correspondence to the high-beam light source, and rays emitted by the high-beam light source being converged by the high-beam light converging part and being then sequentially emitted by the high-beam light transmission part and the light emitting part to form a high-beam light shape; the main low-beam module including a low-beam optical element and at least one low-beam light source, the low-beam optical element including an optical channel, the optical channel including a first optical channel and a second optical channel that are integrally formed, at least one low-beam light converging part being integrally formed on a rear end of the first optical channel, a low-beam light emitting surface being formed in a front end of the second optical channel, and the low-beam light converging part being in one-to-one correspondence to the low-beam light source; the low-beam light converging part and the first optical channel being both located above an optical axis of the low-beam light emitting surface, and an optical axis of the low-beam light converging part being obliquely disposed with respect to the optical axis of the low-beam light emitting surface; a reflecting part being formed on a lower surface of the first optical channel, a cut-off part being disposed on a position on which the reflecting part intersects with a rear end surface of the second optical channel, rays emitted by the low-beam light source sequentially passing through the first optical channel and the second optical channel after being converged by the low-beam light converging part, and being emitted by the low-beam light emitting surface to form a low-beam light shape; and the auxiliary low-beam module including an auxiliary low-beam primary optical element, a lens, and at least one auxiliary low-beam light source, the auxiliary low-beam primary optical element including an auxiliary low-beam light transmission part and at least one auxiliary low-beam light converging part, a rear end of the auxiliary low-beam light transmission part and the auxiliary low-beam light converging part being integrally formed, an auxiliary low-beam primary light emitting surface being formed on a front end of the auxiliary low-beam light transmission part, the auxiliary low-beam light converging part being in one-to-one correspondence to the auxiliary low-beam light source, rays emitted by the auxiliary low-beam light source being irradiated onto the auxiliary low-beam light transmission part after being converged by the auxiliary low-beam light converging part, being irradiated onto the lens after being emitted by the auxiliary low-beam primary light emitting surface, and being refracted by the lens to form an auxiliary low-beam light shape.

Preferably, the high-beam light converging part is of a protruding structure protruding backwards; the low-beam light converging part is of a light converging cup structure, an external contour surface of the low-beam light converging part is a curved surface of which a caliber is gradually increased from back to front, or the low-beam light converging part is of a protruding structure protruding backwards; and the auxiliary low-beam light converging part is of a light converging cup structure, an external contour surface of the auxiliary low-beam light converging part is a curved surface of which a caliber is gradually increased from back to front, or the auxiliary low-beam light converging part is of a protruding structure protruding backwards.

Preferably, the lens is a plano-convex lens or a biconvex lens or an arc-shaped lens, a longitudinal section of the arc-shaped lens is a plano-convex surface or a biconvex surface, and the arc-shaped lens is formed by rotating the longitudinal section with a vertical axis where a focus of the arc-shaped lens is located as a rotating shaft.

Preferably, a III area structure is disposed on a lower surface of the auxiliary low-beam light transmission part, the III area structure is provided with a III area lower surface, and a III area light emitting surface is formed between the III area lower surface and the lower surface of the auxiliary low-beam light transmission part.

Preferably, each of the modules includes a heat radiator, and a dimming system is disposed on a rear end of the heat radiator of at least one of the modules.

Preferably, the dimming system includes a left-right dimming mechanism and a up-down dimming mechanism, the left-right dimming mechanism includes a fixed frame and a left-right dimming screw disposed in a left-right direction, and the left-right dimming screw is rotatably mounted on the fixed frame; the up-down dimming mechanism includes a support frame, a up-down dimming screw disposed in a up-down direction, and a screwed connector in screwed connection with the up-down dimming screw, the support frame is slidably mounted on the fixed frame and is in screwed connection with a screw rod of the left-right dimming screw, the up-down dimming screw is rotatably mounted on the support frame, and the screwed connector is fixed to the heat radiator; the up-down dimming screw is rotated, and the screwed connector moves up and down to drive the heat radiator to move up and down, so that the heat radiator rotates around a up-down dimming axis to perform up-down dimming; and the left-right dimming screw is rotated, the up-down dimming mechanism moves left and right, and the up-down dimming screw of the up-down dimming mechanism drives the heat radiator to move left and right, so that the heat radiator rotates around a left-right dimming axis to perform left-right dimming.

Preferably, one of the fixed frame and the support frame is provided with a sliding block in the left-right direction, and the other one is provided with a sliding chute cooperating with the sliding block.

Preferably, the heat radiator is provided with a first heat radiation fin, left and right sides of the screwed connector are fixed to the first heat radiation fin, and a gap is disposed between each of front and rear sides of the screwed connector and the first heat radiation fin.

Preferably, the dimming system further includes a rotating frame, the rotating frame is provided with a rotating shaft disposed in a up-down direction, the fixed frame is provided with a through hole cooperating with the rotating shaft, the left-right dimming axis is a central axis of the rotating shaft, and the heat radiator is suitable for driving the rotating frame to move left and right, so that the rotating frame drives the heat radiator to rotate around the left-right dimming axis.

Preferably, the heat radiator is provided with a second heat radiation fin, left and right sides of the second heat radiation fin are respectively provided with coaxial cylindrical convex blocks, left and right ends of the rotating frame are respectively provided with circular holes cooperating with the cylindrical convex blocks on corresponding sides, and the up-down dimming axis is a central axis of the coaxial cylindrical convex blocks.

Preferably, one of the second heat radiation fin and the rotating frame is provided with a convex block, and the other one is provided with a groove cooperating with the convex block, so that the heat radiator and the rotating frame are capable of synchronously rotating and moving in the left-right direction.

Preferably, the rotating shaft is a screw stud, the screw stud is mounted in the through hole by a screw, and a plurality of ribs in linear contact with the through hole are disposed on an outer surface of the screw stud.

left-right dimming screw and the up-down dimming screw is provided with a limiting surface, the screw rod of each of the left-right dimming screw and the up-down dimming screw is provided with a clamping slot, the left-right dimming screw is mounted on the fixed frame by the limiting surface of the left-right dimming screw and a check washer mounted in the clamping slot of the left-right dimming screw, and the up-down dimming screw is mounted on the support frame by the limiting surface of the up-down dimming screw and a check washer mounted in the clamping slot of the up-down dimming screw.

Preferably, a screw head of each of the left-right dimming screw and the up-down dimming screw is provided with a dimming tool inserting hole, so that a dimming tool is inserted to drive the left-right dimming screw and the up-down dimming screw to rotate.

Preferably, an outer ring of a screw head of each of the left-right dimming screw and the up-down dimming screw is provided with a dimming gear, and each of the fixed frame and the support frame is provided with a dimming tool guide sleeve, so that a dimming tool is inserted and used to toggle the dimming gear to drive the left-right dimming screw and the up-down dimming screw to rotate.

A second aspect of the present disclosure further provides a vehicle headlamp, including the above-mentioned vehicle headlamp optical system.

A third aspect of the present disclosure further provides a vehicle, including the above-mentioned vehicle headlamp.

In the present disclosure, by disposing the plurality of small-opening modules, the vehicle headlamp optical system can have a very small up-down height and can be adapted to narrow and long light distribution lenses, so that the overall appearance of the vehicle headlamp is narrow and long, the visual effect in design can be improved, and then, the miniaturization and diversified design of the vehicle headlamp are achieved; and by disposing the high-beam module, the main low-beam module, and the auxiliary low-beam module, high-beam, main low-beam and auxiliary low-beam lighting functions can be achieved at the same time, and the design demand for functional diversification of the vehicle headlamp can be met.

The dimming system provided in the present disclosure is disposed on the rear end of the heat radiator, and thus, the design and layout of other parts of the module cannot be affected; moreover, the dimming system is compact in overall structure and small in space occupation, and the size of the module in the up-down and left-right directions is basically not increased, so that the overall design of the vehicle headlamp cannot be affected, and a wider design space is brought for the design of the vehicle headlamp; and by disposing the left-right dimming screw and the up-down dimming screw, the dimming screws can be rotated to drive the heat radiator to rotate left-right or up-down, thereby driving the overall module to rotate left-right or up-down to achieve the left-right and up-down dimming of the module and convenience in dimming.

Other characteristics and advantages of the present disclosure will be described in detail in the subsequent specific implementations.

Figure 1:
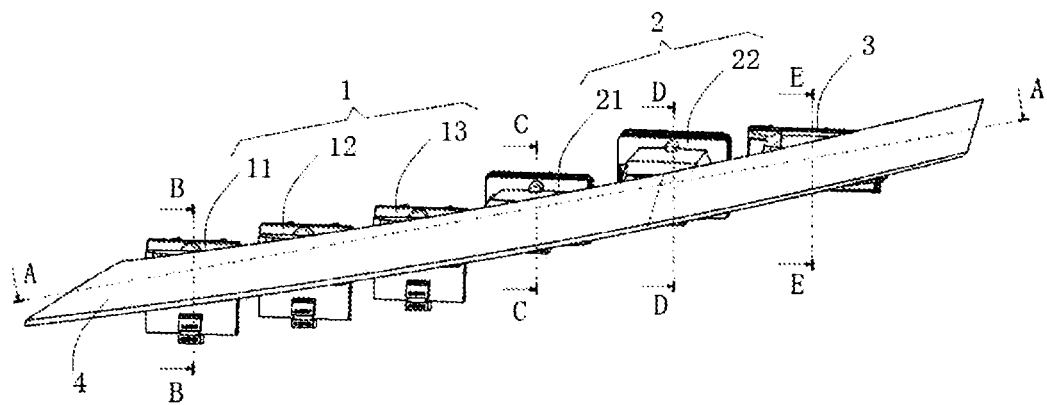
FIG. 1 is a schematic structural view of an embodiment of the present disclosure.

DESCRIPTION FOR REFERENCE NUMERALS IN THE ACCOMMODATING DRAWINGS 1 high-beam module; 11 first high-beam module; 110 high-beam light converging part; 111 high-beam light transmission part; 1110 light-impervious layer; 112 light emitting part; 1120 high-beam light emitting surface; 113 high-beam heat radiator; 114 high-beam circuit board; 1141 high-beam light source; 12 second high-beam module; 13 third high-beam module; 2 auxiliary low-beam module; 21 first auxiliary low-beam module; 211 supporting part; 212 arc-shaped lens; 213 auxiliary low-beam heat radiator; 214 auxiliary low-beam circuit board; 2141 auxiliary low-beam light source, 215 auxiliary low-beam light converging part; 216 auxiliary low-beam light transmission part; 2160 auxiliary low-beam primary light emitting surface; 217 III area structure; 2171 III area lower surface; 2172 III area light emitting surface; 22 second auxiliary low-beam module; 221 supporting part; 222 biconvex lens; 223 auxiliary low-beam heat radiator; 224 auxiliary low-beam circuit board; 2241 auxiliary low-beam light source, 225 auxiliary low-beam light converging part; 226 auxiliary low-beam light transmission part; 2260 auxiliary low-beam primary light emitting surface; 3 main low-beam module; 31 low-beam heat radiator; 32 low-beam light converging part; 33, optical channel; 331 first optical channel; 3311 reflecting part; 3312 cut-off part; 332 second optical channel; 34 low-beam light emitting surface; 340 optical axis; 35 low-beam circuit board; 351 low-beam light source; 4 light distribution lens; 5 dimming system; 51 left-right dimming screw; 511 left-right dimming tool inserting hole; 512 left-right dimming gear; 513 screw rod; 5131 clamping slot; 514 check washer; 515 limiting surface; 52 fixed frame; 521 left-right dimming tool guide sleeve; 522 sliding block; 523 through hole; 53 up-down dimming screw; 531 up-down dimming tool inserting hole; 532 up-down dimming gear; 533 screw rod; 5331 clamping slot; 534 limiting surface; 535 check washer; 54 support frame; 541 up-down dimming tool guide sleeve; 542 sliding chute; 543 screwed hole; 55 screwed connector; 551 gap; 552 through slot; 56 rotating frame; 560 left-right dimming axis; 561 circular hole; 562 screw stud; 5621 rib; 563 screw; 564 groove; 61 first heat radiation fin; 62 second heat radiation fin; 620 up-down dimming axis; 621 cylindrical convex block; 622 convex block; a low-beam light shape; a1 main low-beam light shape; a2 auxiliary low-beam light shape; and b high-beam light shape.

DETAILED DESCRIPTION OF THE EMBODIMENTS

In the description of the present disclosure, it should be noted that directional or positional relationships indicated by terms such as "upper", "lower", "front", "rear", "left" and "right" are merely intended to facilitate describing the present disclosure and simplifying the description, rather than to indicate or imply that the appointed device or element has to be located in a specific direction or structured and operated in the specific direction so as not to be understood as restrictions on the present disclosure, wherein "upper" and "lower" refer to directions parallel to a screw rod 533 of a up-down dimming screw 53, "upper" refers to a direction away from a screw head of the up-down dimming screw 53 and close to the screw rod 533 of the up-down dimming screw 53, and "lower" refers to a direction opposite to the direction indicated by "upper"; "left" and "right" refer to directions parallel to a screw rod 513 of a left-right dimming screw 51, "right" refers to a direction away from a screw head of the left-right dimming screw 51 and close to the screw rod 513 of the left-right dimming screw 51, and "left" refers to a direction opposite to the direction indicated by "right"; and "front" refers to a ray emitting direction, and "rear" refers to a direction opposite to the direction indicated by "front".

The specific implementations of the present disclosure will be described in detail below in conjunction with the accompanying drawings. It should be understood that the specific implementations described herein are merely intended to describe and explain the present disclosure, rather than to limit the present disclosure.

The present disclosure provides a vehicle headlamp optical system, including a plurality of modules and light distribution lenses 4 that are disposed in fronts of all the modules, wherein the plurality of modules include at least one high-beam module 1, at least one main low-beam module 3, and at least one auxiliary low-beam module 2; the light distribution lenses 4 are narrow and long light distribution lenses; all the modules are disposed at intervals along the length directions of the light distribution lenses 4, wherein up and down openings of the modules are very small, that is, each of the modules is a small-opening module.

Figure 17:
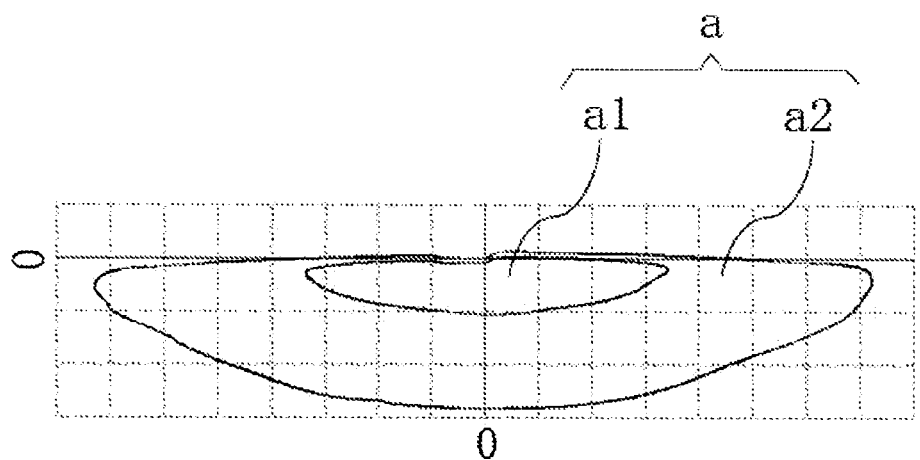
FIG. 17 is a schematic view of a low-beam light shape in an embodiment of the present disclosure.
Figure 18:
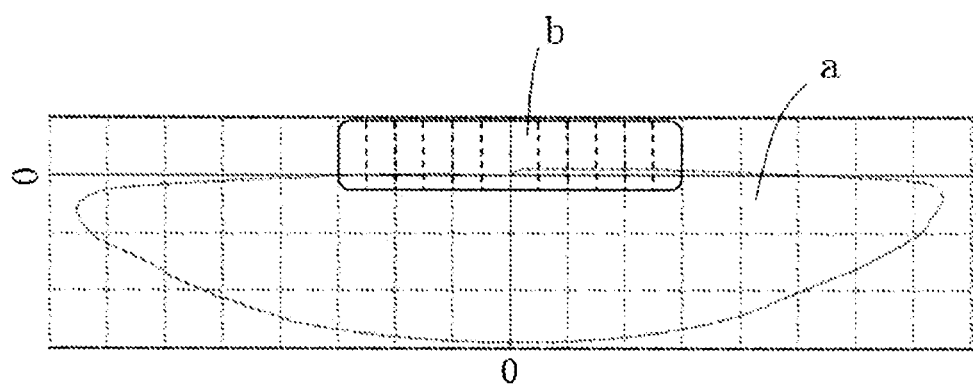
FIG. 18 is a schematic view of a complete light shape in an embodiment of the present disclosure.

By disposing the plurality of small-opening modules, the vehicle headlamp optical system can have a very small up and down height and can be adapted to the narrow and long light distribution lenses 4, so that the overall appearance of the vehicle headlamp is narrow and long, the visual effect in design can be improved, and then, the miniaturization and diversified design of the vehicle headlamp are achieved; and by disposing the high-beam module 1, the main low-beam module 3, and the auxiliary low-beam module 2, high-beam, main low-beam and auxiliary low-beam lighting functions can be achieved at the same time, and the design demand for functional diversification of the vehicle headlamp can be met. As shown in FIG. 17 and FIG. 18, the high-beam module 1 forms a high-beam light shape b, the main low-beam module 3 cooperates with the auxiliary low-beam module 2 to form a low-beam light shape a, the main low-beam module 3 forms a main low-beam light shape a1, i.e. a low-beam central area light shape, and the auxiliary low-beam module 2 forms an auxiliary low-beam light shape a2, i.e. a low-beam widened area light shape.

As shown in FIG. 3 to FIG. 7, the high-beam module 1 includes a high-beam optical element and at least one high-beam light source 1141, the high-beam optical element includes a high-beam light transmission part 111 and a light emitting part 112, at least one high-beam light converging part 110 is disposed on a rear end of the high-beam light transmission part 111, the high-beam light converging part 110, the high-beam light transmission part 111 and the light emitting part 112 are sequentially connected and are integrally formed, the high-beam light converging part 110 is in one-to-one correspondence to the high-beam light source 1141, rays emitted by the high-beam light source 1141 are converged by the high-beam light converging part 110 and are then sequentially emitted by the high-beam light transmission part 111 and the light emitting part 112 to form a high-beam light shape b which is finally emitted by the light distribution lenses 4, and the light distribution lenses 4 can adjust the illuminance and uniformity of the high-beam light shape b.

By disposing the high-beam light converging part 110 and the high-beam light transmission part 111, the rays emitted by the high-beam light source 1141 can be well converged in the up-down direction, so that a up-down height of a light emitting surface of the light emitting part 112 can be made very small, up-down heights of the high-beam light converging part 110 and the high-beam light transmission part 111 can also be made very small, a up-down height of the overall high-beam module can be made very small, and then, a small-opening design of the high-beam module is achieved; and by integrally forming the high-beam light converging part 110, the high-beam light transmission part 111 and the light emitting part 112, i.e. integrating a primary optical element and a secondary optical element, the integration level is high, the number of parts is reduced, the volume of the high-beam module is reduced, one-step mounting is only needed, errors caused by secondary mounting are avoided, and the relative position precision of the both can be guaranteed, so that the stability of the light shape is better guaranteed.

The high-beam light converging part 110 may be in various forms. For example, the high-beam light converging part 110 may be of a solid light converging cup structure, an external contour surface of the high-beam light converging part 110 is a curved surface of which a caliber is gradually increased from back to front, and a light incident surface of the high-beam light converging part 110 may be a plane or a curved surface; or the high-beam light converging part 110 is of a light converging cup structure with a recessed cavity, an external contour surface of the high-beam light converging part 110 is a curved surface of which a caliber is gradually increased from back to front, and a light incident end of the high-beam light converging part 110 is provided with a recessed cavity which is opened backwards and is internally provided with a protrusion protruding backwards; or the high-beam light converging part 110 is of a protruding structure protruding backwards. The high-beam light converging part 110 is preferably of the protruding structure protruding backwards. Of course, there may be a plurality of high-beam light converging parts 110 which may be disposed in one or more rows.

Specifically, the light emitting part 112 is provided with a high-beam light emitting surface 1120 which is a convex lens light emitting surface, so that the rays emitted by the high-beam light source 1141 form the high-beam light shape b after sequentially passing through the high-beam light converging part 110, the high-beam light transmission part 111, and the light emitting part 112.

Preferably, a light-impervious layer 1110 is disposed on an outer surface of the high-beam light transmission part 111, so that stray light emitted from the outside of the high-beam light emitting surface 1120 of the light emitting part 112 can be reduced, and influences on a high-beam lighting effect can be avoided. Preferably, the light-impervious layer 1110 and the high-beam light transmission part 111 are integrally formed by double-shot molding and are convenient to machine, so that the light-impervious layer 1110 and the high-beam light transmission part 111 are firmly connected and are not required to be assembled, so that the number of assembling parts is reduced.

Figure 19:
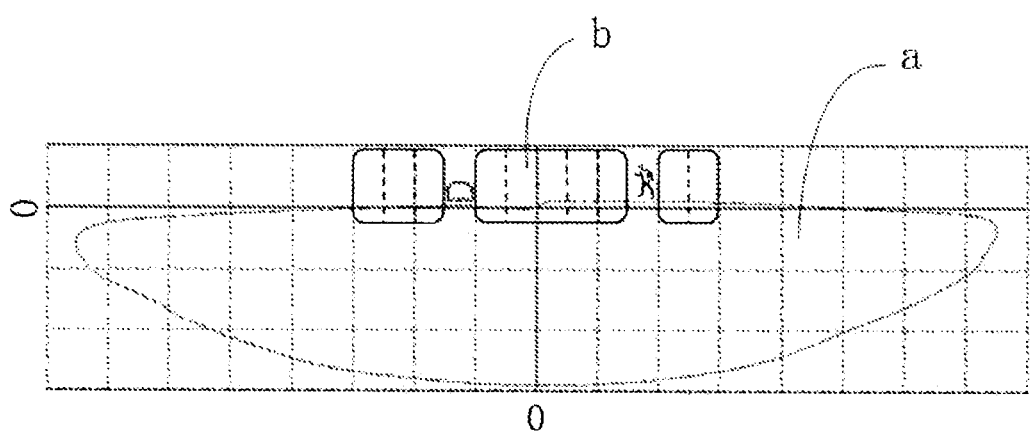
FIG. 19 is a schematic view of an ADB light shape in an embodiment of the present disclosure.
Figure 20:
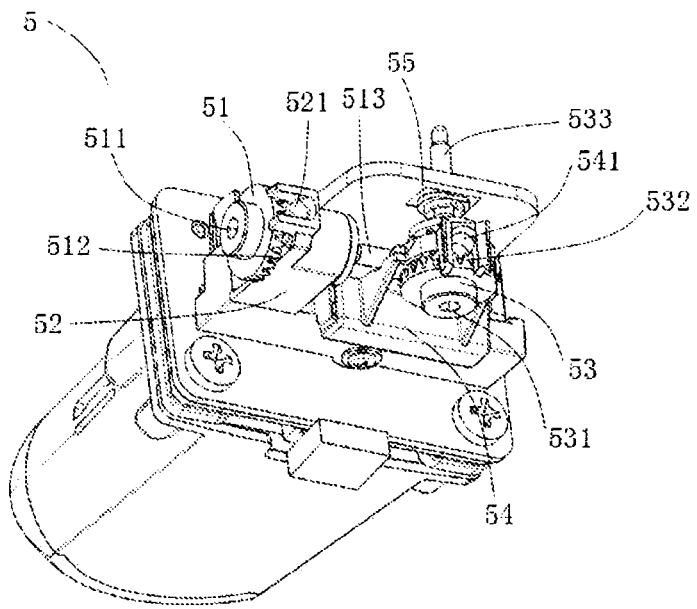
FIG. 20 is a schematic structural view of another embodiment of the present disclosure.
Figure 21:
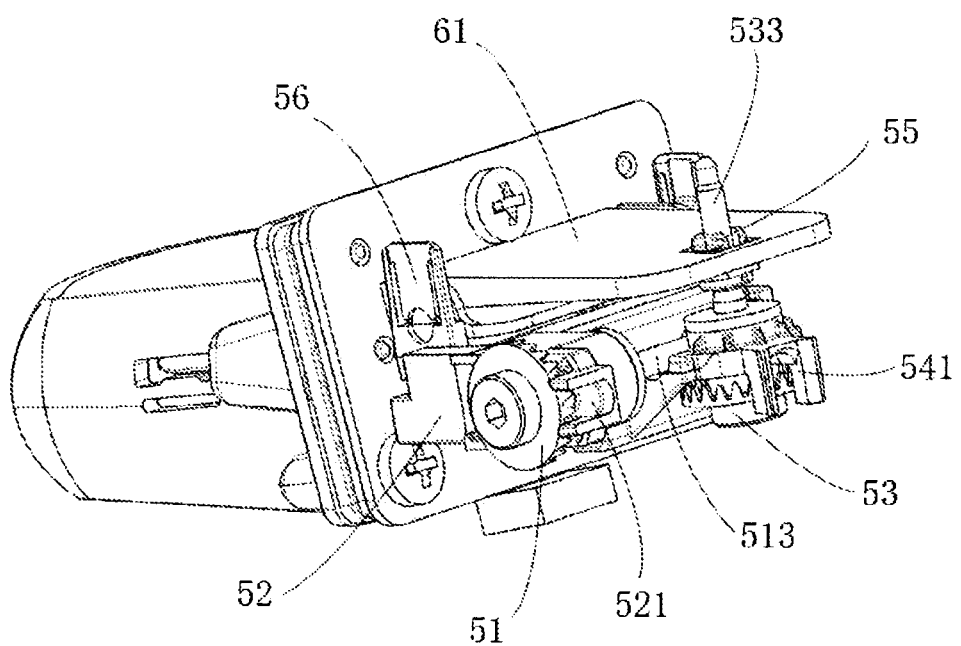
FIG. 21 is a first schematic structural view of a dimming system in another embodiment of the present disclosure.
Figure 22:
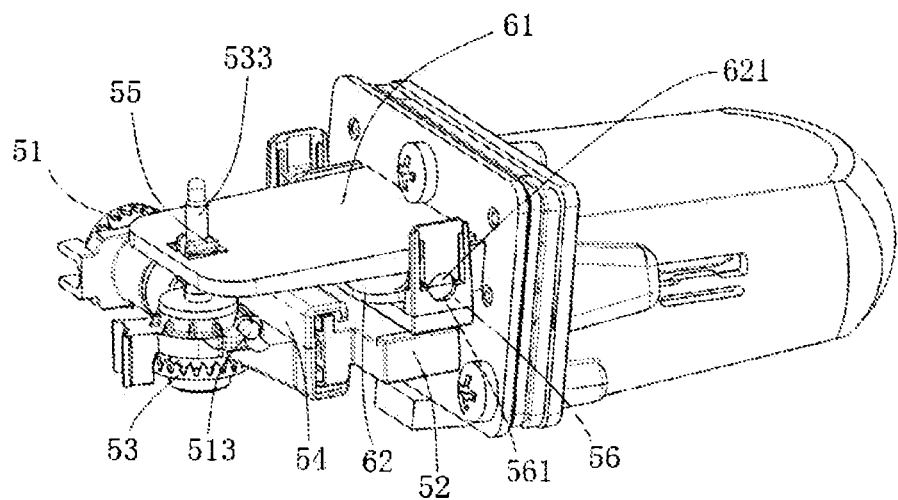
FIG. 22 is a second schematic structural view of a dimming system in another embodiment of the present disclosure.

Preferably, the high-beam light source 1141 is suitable for being independently controlled. Therefore, during high-beam lighting, by controlling the on or off of each high-beam light source 1141, an irradiation area of a vehicle lamp is controlled to keep away from an area where a vehicle running in an opposite direction is located and to avoid a problem of glaring, so that an intelligent anti-glaring effect is achieved, and ADB high-beam lighting is achieved, wherein a formed ADB light shape is shown in FIG. 19.

Further, the high-beam module 1 further includes a high-beam circuit board 114 and a high-beam heat radiator 113, the high-beam light source 1141 is mounted on the high-beam circuit board 114, and the high-beam optical element and the high-beam circuit board 114 are both mounted on the high-beam heat radiator 113.

Figure 14:
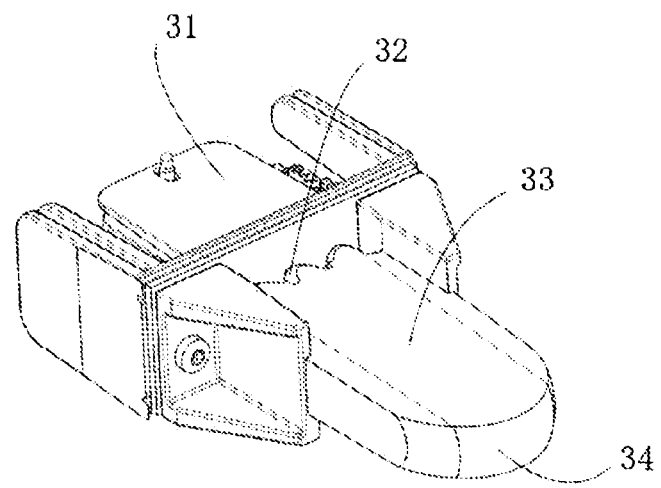
FIG. 14 is a schematic view of a three-dimensional structure of a main low-beam module in an embodiment of the present disclosure.
Figure 15:
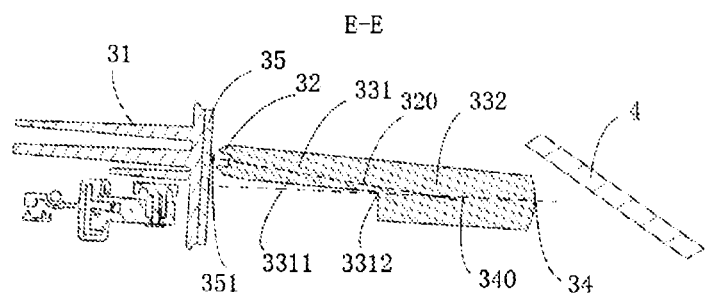
FIG. 15 is an E-E sectional view of a main low-beam module in an embodiment of the present disclosure in FIG. 1.
Figure 16:
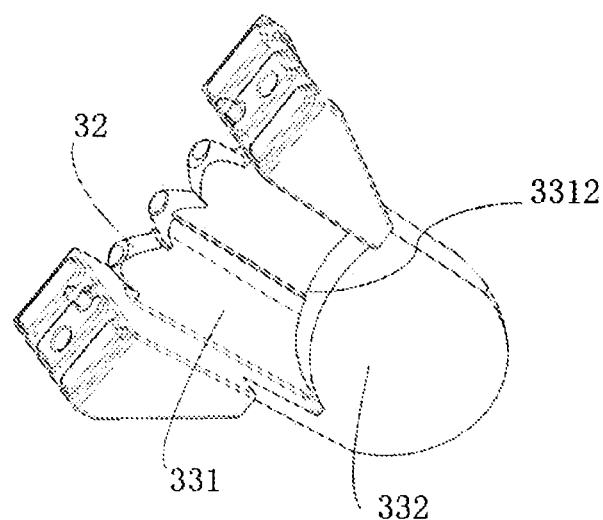
FIG. 16 is a schematic view of a three-dimensional structure of a low-beam optical element of a main low-beam module in an embodiment of the present disclosure.

As shown in FIG. 14 to FIG. 16, the main low-beam module 3 includes a low-beam optical element and at least one low-beam light source 351, the low-beam optical element includes an optical channel 33, the optical channel 33 includes a first optical channel 331 and a second optical channel 332 that are integrally formed, at least one low-beam light converging part 32 is integrally formed on a rear end of the first optical channel 331, a low-beam light emitting surface 34 is formed in a front end of the second optical channel 332, and the low-beam light converging part 32 is in one-to-one correspondence to the low-beam light source 351; the low-beam light converging part 32 and the first optical channel 331 are both located above an optical axis 340 of the low-beam light emitting surface 34, and an optical axis 320 of the low-beam light converging part 32 is obliquely disposed with respect to the optical axis 340 of the low-beam light emitting surface 34; a reflecting part 3311 is formed on a lower surface of the first optical channel 331, a cut-off part 3312 is disposed on a position on which the reflecting part 3311 intersects with a rear end surface of the second optical channel 332, rays emitted by the low-beam light source 351 sequentially pass through the first optical channel 331 and the second optical channel 332 after being converged by the low-beam light converging part 32, and are emitted by the low-beam light emitting surface 34 to form a main low-beam light shape a1 which is finally emitted by the light distribution lenses 4, and the light distribution lenses 4 can adjust the illuminance and uniformity of the main low-beam light shape a1.

By disposing the low-beam light converging part 32 and the optical channel 33, the rays emitted by the low-beam light source 351 may be well converged in a up-down direction, so that a up-down height of the low-beam light emitting surface 34 can be made very small, up-down heights of the low-beam light converging part 32 and the optical channel 33 can also be made very small, a up-down height of the overall main low-beam module 3 can be made very small, and then, a small-opening design of the main low-beam module 3 is achieved; and by designing the low-beam light converging part 32 and the optical channel 33 which are integrally formed, and integrating a primary optical element and a secondary optical element, the integration level is high, the number of parts is reduced, the volume of the main low-beam module 3 is reduced, one-step mounting is only needed, errors caused by secondary mounting are avoided, and the relative position precision of the both can be guaranteed, so that the stability of the light shape is better guaranteed. By disposing the low-beam light converging part 32 and the first optical channel 331 above the optical axis 340 of the low-beam light emitting surface 34 and obliquely disposing the optical axis 320 of the low-beam light converging part 32 with respect to the optical axis 340 of the low-beam light emitting surface 34, the rays converged by the low-beam light converging part 32 can sequentially pass through the first optical channel 331 and the second optical channel 332 and are emitted by the low-beam light emitting surface 34 to form the main low-beam light shape a1, and the rays emitted by the first optical channel 331 can also enter the second optical channel 332 as much as possible and can be emitted by the low-beam light emitting surface 34. Therefore, the light effect is improved, materials can be saved, and the production cost can be reduced.

A specific path of the rays emitted by the low-beam light source 351 is that: one part of the rays converged by the low-beam light converging part 32 are directly irradiated onto the second optical channel 332 and are irradiated onto an area below a zero-DEG horizontal line by the low-beam light emitting surface 34 after entering the first optical channel 331, and the other part of the rays are irradiated onto the lower surface of the first optical channel 331, this part of rays can be reflected to the second optical channel 332 by the reflecting part 3311 and are irradiated onto an area below the zero-DEG horizontal line by the low-beam light emitting surface 34, and there is still a part of rays which are irradiated to the second optical channel 332 by the cut-off part 3312 and are emitted by the low-beam light emitting surface 34 to from a low-beam cut-off line near the zero-DEG horizontal line, so that the rays converged by the low-beam light converging part 32 are finally emitted by the low-beam light emitting surface 34 to form the main low-beam light shape a1 with a light and dark cut-off line as shown in FIG. 17. Therefore, by disposing the reflecting part 3311, the rays irradiated onto the lower surface of the first optical channel 331 can be reflected to the second optical channel 332 and emitted by the low-beam light emitting surface 34, so that the rays entering the second optical channel 332 can be increased. By disposing the cut-off part 3312 which is adapted to the low-beam cut-off line in shape, the rays irradiated onto the cut-off part 3312 form the low-beam cut-off line after being emitted by the low-beam light emitting surface 34, it is unnecessary to additionally adopt a light shielding plate for shielding to form the cut-off line, and meanwhile, it is also unnecessary to dispose a driving mechanism for driving the light shielding plate to achieve high-beam and low-beam switching, so that mechanical faults are eliminated, parts are reduced, the structure is simplified, and spatial utilization efficiency and the light distribution efficiency are higher.

It should be noted that each of the low-beam light converging part 32 and the low-beam light emitting surface 34 has a focus, the optical axis 320 of the low-beam light converging part 32 refers to an axis passing through the focus of the low-beam light converging part 32, and the optical axis 340 of the low-beam light emitting surface 34 refers to an axis passing through the focus of the low-beam light emitting surface 34 and extending in a back-and-forth direction. The low-beam light emitting surface 34 may be a convex lens light emitting surface or a Fresnel lens light emitting surface. The cut-off part 3312 is disposed on the focus of the low-beam light emitting surface 34, so that the rays converged by the low-beam light converging part 32 can be more intensively irradiated onto the cut-off part 3312 to form the main low-beam light shape a1 with the clear light and dark cut-off line. The cut-off part 3312 may be set to be in a shape having a left-right height difference or a linear shape or other shapes meeting an lighting demand as actually required.

Optionally, the low-beam light converging part 32 may be in various forms. For example, the low-beam light converging part 32 may be of a solid light converging cup structure, an external contour surface of the low-beam light converging part 32 is a curved surface of which a caliber is gradually increased from back to front, and a light incident surface of the low-beam light converging part 32 may be a plane or a curved surface; or the low-beam light converging part 32 is of a light converging cup structure with a recessed cavity, an external contour surface of the low-beam light converging part 32 is a curved surface of which a caliber is gradually increased from back to front, and a light incident end of the low-beam light converging part 32 is provided with a recessed cavity which is opened backwards and is internally provided with a protrusion protruding outwards; or the low-beam light converging part 32 is of a protruding structure protruding backwards. There may be a plurality of low-beam light converging parts 32 which may be disposed in one or more rows.

Further, the main low-beam module 3 further includes a low-beam circuit board 35 and a low-beam heat radiator 31, the low-beam light source 351 is mounted on the low-beam circuit board 35, and the low-beam optical element and the low-beam circuit board 35 are both mounted on the low-beam heat radiator 31.

As shown in FIG. 8 to FIG. 13, the auxiliary low-beam module 2 includes an auxiliary low-beam primary optical element, a lens, and at least one auxiliary low-beam light source 2141, the auxiliary low-beam primary optical element includes an auxiliary low-beam light transmission part 216 and at least one auxiliary low-beam light converging part 215, a rear end of the auxiliary low-beam light transmission part 216 and the auxiliary low-beam light converging part 215 are integrally formed, an auxiliary low-beam primary light emitting surface 2160 is formed on a front end of the auxiliary low-beam light transmission part 216, the auxiliary low-beam light converging part 215 is in one-to-one correspondence to the auxiliary low-beam light source 2141, rays emitted by the auxiliary low-beam light source 2141 are irradiated onto the auxiliary low-beam light transmission part 216 after being converged by the auxiliary low-beam light converging part 215, are irradiated onto the lens after being emitted by the auxiliary low-beam primary light emitting surface 2160, and are refracted by the lens to form an auxiliary low-beam light shape a2 which is finally emitted by the light distribution lenses 4, and the light distribution lenses 4 can adjust the illuminance and uniformity of the auxiliary low-beam light shape a2.

By disposing the auxiliary low-beam light transmission part 216 and the auxiliary low-beam light converging part 215, the rays emitted by the auxiliary low-beam light source 2141 can be well converged in a up-down direction, so that a up-down height of a light emitting surface of the lens can be made very small, up-down heights of the auxiliary low-beam light transmission part 216 and the auxiliary low-beam light converging part 215 can also be made very small, a up-down height of the overall auxiliary low-beam module 2 can be made very small, and then, a small-opening design of the auxiliary low-beam module 2 is achieved.

The auxiliary low-beam light converging part 215 may be in various forms. For example, the auxiliary low-beam light converging part 215 may be of a solid light converging cup structure, an external contour surface of the auxiliary low-beam light converging part 215 is a curved surface of which a caliber is gradually increased from back to front, and a light incident surface of the auxiliary low-beam light converging part 215 may be a plane or a curved surface; or the auxiliary low-beam light converging part 215 is of a light converging cup structure with a recessed cavity, an external contour surface of the auxiliary low-beam light converging part 215 is a curved surface of which a caliber is gradually increased from back to front, and a light incident end of the auxiliary low-beam light converging part 215 is provided with a recessed cavity which is opened backwards and is internally provided with a protrusion protruding backwards; or the auxiliary low-beam light converging part 215 is of a protruding structure protruding backwards. Of course, there may be a plurality of auxiliary low-beam light converging parts 215 which may be disposed in one or more rows.

Specifically, an auxiliary low-beam cut-off line structure is disposed on a lower edge of a front end of the auxiliary low-beam light transmission part 216 and is adapted to an auxiliary low-beam cut-off line in shape, so that rays irradiated onto the auxiliary low-beam cut-off line structure form the auxiliary low-beam cut-off line after being emitted by the lens. The auxiliary low-beam cut-off line structure is preferably disposed on a focus of the lens, so that the rays converged by the auxiliary low-beam light converging part 215 can be more intensively irradiated onto the auxiliary low-beam cut-off line structure to form the auxiliary low-beam light shape a2 with the clear light and dark cut-off line. The auxiliary low-beam cut-off line structure may be set to be in a shape having a left-right height difference or a linear shape or other shapes meeting an lighting demand as actually required.

Specifically, a supporting part 211 for supporting the lens is disposed on a rear end of the lens, a cavity passing through front and rear ends of the supporting part 211 is disposed in the supporting part 211, and the auxiliary low-beam optical element is located in the cavity. The supporting part 211 and the lens are integrally formed, and the supporting part 211 is preferably made of a light-impervious material, so that stray light emitted from the outside of the light emitting surface of the lens can be reduced, and influences on an auxiliary low-beam lighting effect can be avoided. Of course, the supporting part 211 may also be a light-pervious material of which the surface is provided with a light shielding coating.

Further, the auxiliary low-beam module 2 further includes an auxiliary low-beam circuit board 214 and an auxiliary low-beam heat radiator 213, the auxiliary low-beam light source 2141 is mounted on the auxiliary low-beam circuit board 214, and the auxiliary low-beam primary optical element, the lens and the auxiliary low-beam circuit board 214 are all mounted on the auxiliary low-beam heat radiator 213.

FIG. 8 to FIG. 11 show a specific structure of the auxiliary low-beam module 2. The lens is an arc-shaped lens 212, a longitudinal section of the arc-shaped lens 212 is a plano-convex surface or a biconvex surface, and the arc-shaped lens 212 is formed by rotating the longitudinal section with a vertical axis where a focus of the arc-shaped lens 212 is located as a rotating shaft. By disposing the arc-shaped lens 212, a diffusion range of rays refracted by the arc-shaped lens 212 can be further widened, so that the rays emitted by the auxiliary low-beam light source 2141 are refracted by the arc-shaped lens 212 to form an auxiliary low-beam light shape a2 with a wider widened angle, and then, a transverse lighting area in front of a vehicle can be widened to provide a wider lighting view for a driver. The auxiliary low-beam module 2 cooperates with the main low-beam module 3, so that the lighting area in front of the vehicle is wider and brighter.

Preferably, a III area structure 217 is disposed on a lower surface of the auxiliary low-beam light transmission part 216, the III area structure 217 is provided with a III area lower surface 2171, and a III area light emitting surface 2172 is formed between the III area lower surface 2171 and the lower surface of the auxiliary low-beam light transmission part 216. A part of rays converged by the auxiliary low-beam light converging part 215 are irradiated onto the III area structure 217, are emitted by the III area light emitting surface 2172 to enter the arc-shaped lens 212, and are refracted by the arc-shaped lens 212 to form a III area low-beam light shape.

Figure 12:
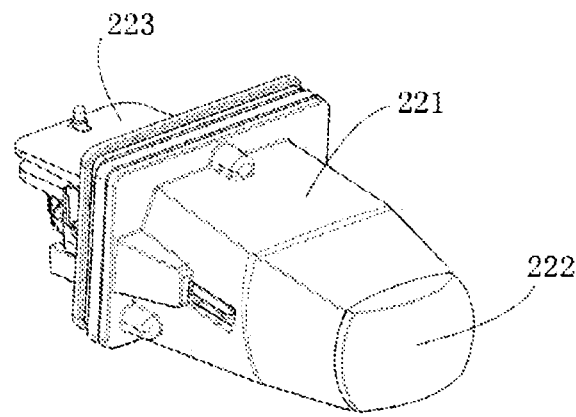
FIG. 12 is a schematic view of a three-dimensional structure of another auxiliary low-beam module in an embodiment of the present disclosure.
Figure 13:
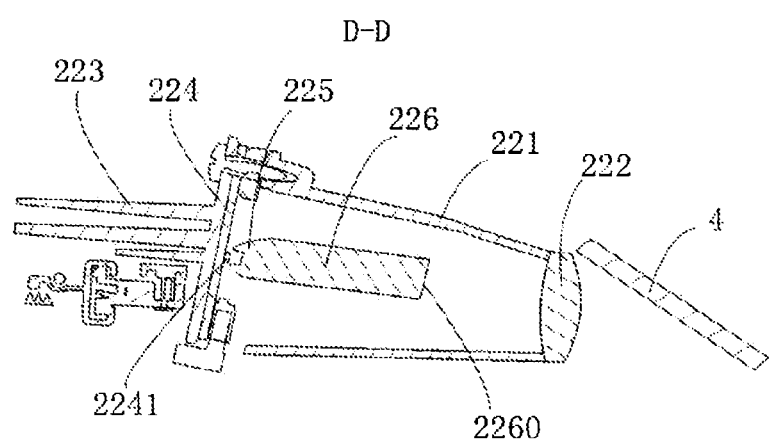
FIG. 13 is a D-D sectional view of an auxiliary low-beam module in another embodiment of the present disclosure in FIG. 1.

FIG. 12 to FIG. 13 show another specific structure of the auxiliary low-beam module 2 which also includes an auxiliary low-beam primary optical element, a lens, and at least one auxiliary low-beam light source 2241, the auxiliary low-beam primary optical element includes an auxiliary low-beam light transmission part 226 and at least one auxiliary low-beam light converging part 225, an auxiliary low-beam primary light emitting surface 2260 is formed on a front end of the auxiliary low-beam light transmission part 226, the auxiliary low-beam light converging part 225 is in one-to-one correspondence to the auxiliary low-beam light source 2241, and a supporting part 221 is disposed on a rear end of the lens. The auxiliary low-beam module 2 further includes an auxiliary low-beam circuit board 224 and an auxiliary low-beam heat radiator 223, the auxiliary low-beam light source 2241 is mounted on the auxiliary low-beam circuit board 224, and the auxiliary low-beam primary optical element, the lens and the auxiliary low-beam circuit board 224 are all mounted on the auxiliary low-beam heat radiator 223, wherein the lens is a biconvex lens 222, of course, the lens may also be a plano-convex lens.

Figure 2:
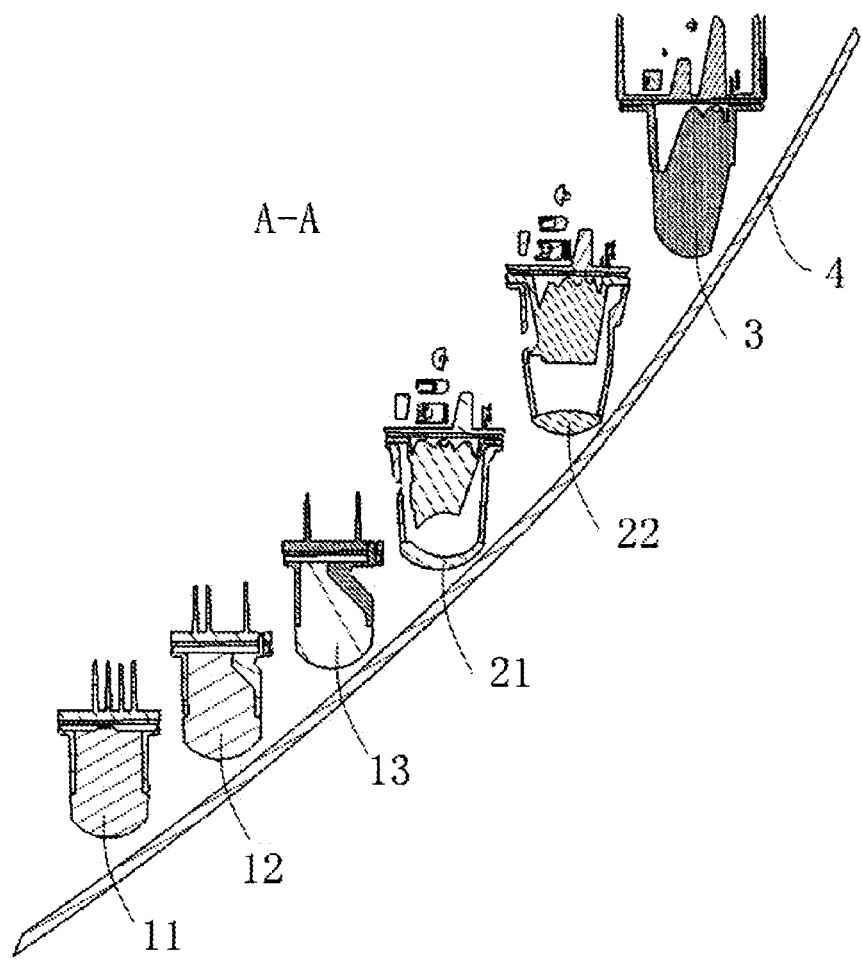
FIG. 2 is an A-A sectional view of FIG. 1.
Figure 3:
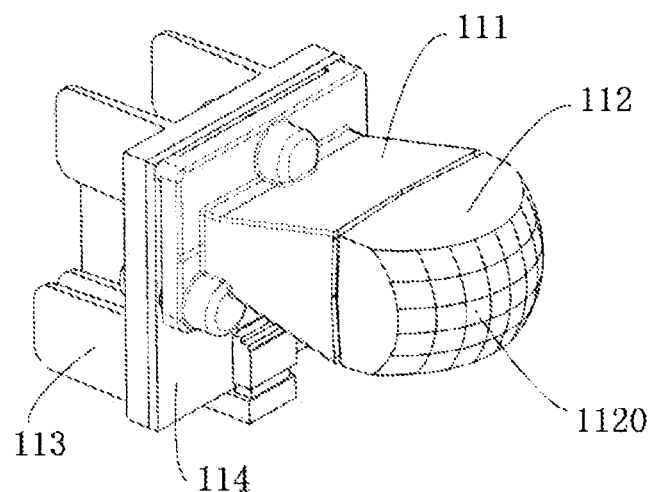
FIG. 3 is a schematic view of a three-dimensional structure of a high-beam module in an embodiment of the present disclosure.
Figure 4:
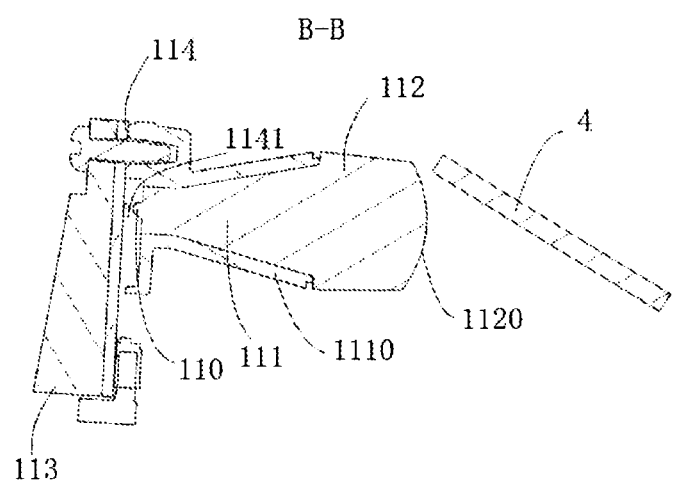
FIG. 4 is a B-B sectional view of a high-beam module in an embodiment of the present disclosure in FIG. 1.
Figure 5:
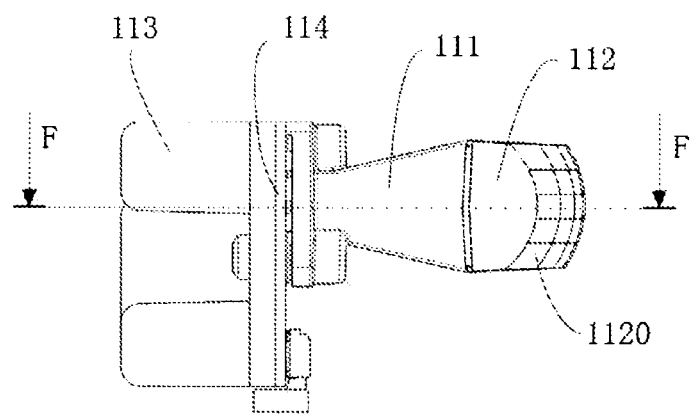
FIG. 5 is a lateral view of a high-beam module in an embodiment of the present disclosure.
Figure 6:
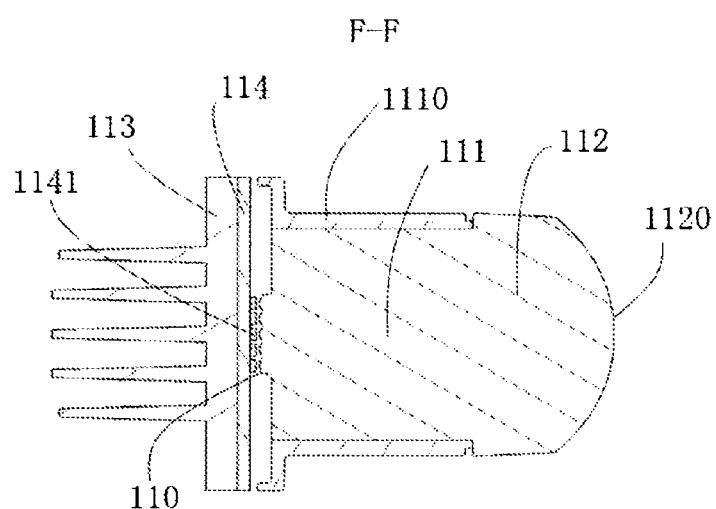
FIG. 6 is an F-F sectional view of FIG. 5.
Figure 7:
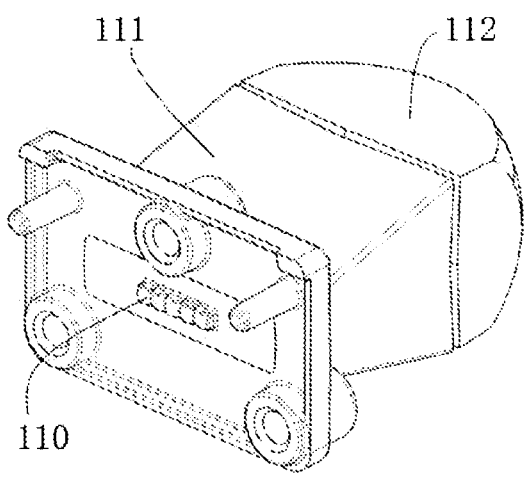
FIG. 7 is a schematic view of a three-dimensional structure of a high-beam optical element of a high-beam module in an embodiment of the present disclosure.
Figure 8:
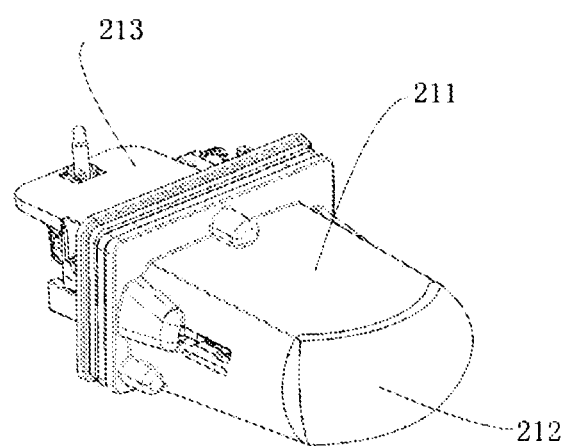
FIG. 8 is a schematic view of a three-dimensional structure of an auxiliary low-beam module in an embodiment of the present disclosure.
Figure 9:
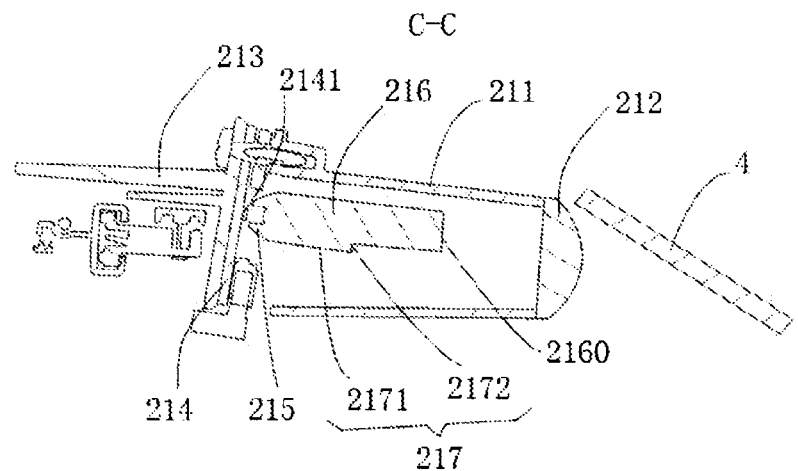
FIG. 9 is a C-C sectional view of an auxiliary low-beam module in an embodiment of the present disclosure in FIG. 1.
Figure 10:
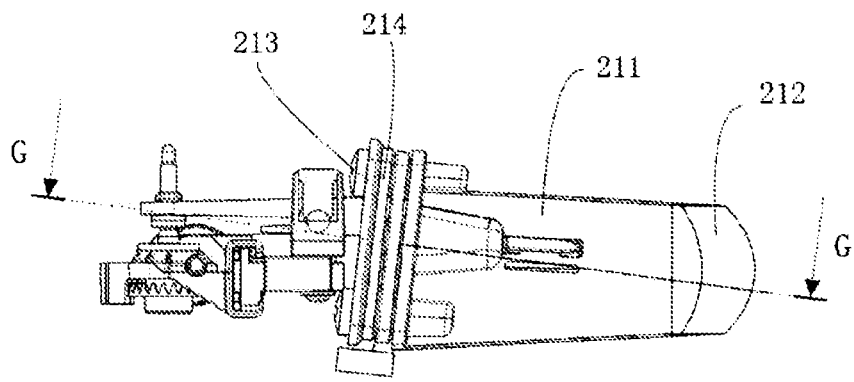
FIG. 10 is a lateral view of an auxiliary low-beam module in an embodiment of the present disclosure.
Figure 11:
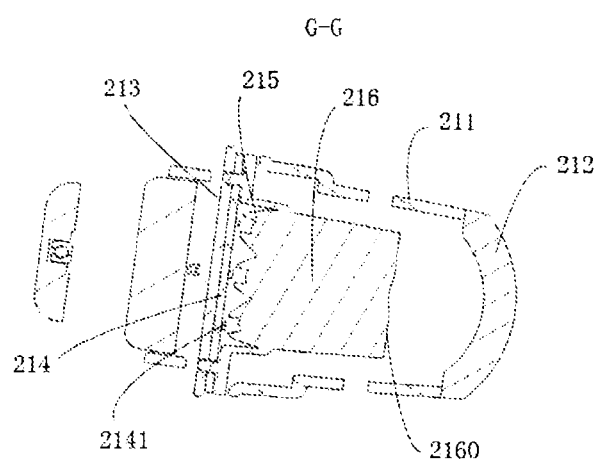
FIG. 11 is a G-G sectional view of FIG. 10.

As a specific embodiment, as shown in FIG. 1 and FIG. 2, the vehicle headlamp optical system includes three high-beam modules 1, one main low-beam module 3, and two auxiliary low-beam modules 2, wherein the two auxiliary low-beam modules 2 are located between the three high-beam modules 1 and the main low-beam module 3, the three high-beam modules 1 are respectively a first high-beam module 11, a second high-beam module 12, and a third high-beam module 13, the two auxiliary low-beam modules 2 are respectively a first auxiliary low-beam module 21 and a second auxiliary low-beam module 22, a structure of the first auxiliary low-beam module 21 is shown in FIG. 8 to FIG. 11, the III area structure 217 is disposed on the lower surface of the auxiliary low-beam light transmission part 216, and a structure of the second auxiliary low-beam module 22 is shown in FIG. 12 to FIG. 13.

Each of the above-mentioned modules includes a heat radiator, and preferably, a dimming system 5 is disposed on a rear end of the heat radiator of at least one of the modules.

Specifically, as shown in FIG. 20 to FIG. 38, the dimming system 5 includes a left-right dimming mechanism and a up-down dimming mechanism, the left-right dimming mechanism includes a fixed frame 52 and a left-right dimming screw 51 disposed in a left-right direction, the fixed frame 52 is fixedly connected to a housing of a vehicle headlamp or is fixedly connected to other parts, fixed with respect to the housing of the vehicle headlamp, of the vehicle headlamp, and the left-right dimming screw 51 is rotatably mounted on the fixed frame 52; the up-down dimming mechanism includes a support frame 54, a up-down dimming screw 53 disposed in a up-down direction, and a screwed connector 55 in screwed connection with the up-down dimming screw 53, the support frame 54 is slidably mounted on the fixed frame 52 and is in screwed connection with a screw rod 513 of the left-right dimming screw 51, the up-down dimming screw 53 is rotatably mounted on the support frame 54, and the screwed connector 55 is fixed to the heat radiator; the up-down dimming screw 53 is rotated, and the screwed connector 55 moves up and down to drive the heat radiator to move up and down, so that the heat radiator rotates around a up-down dimming axis 620 to perform up-down dimming; and the left-right dimming screw 51 is rotated, the up-down dimming mechanism moves horizontally, and the up-down dimming screw 53 of the up-down dimming mechanism drives the heat radiator to move left and right, so that the heat radiator rotates around a left-right dimming axis 560, i.e. the overall module rotates around the left-right dimming axis 560 to perform left-right dimming.

The dimming system 5 provided in the present disclosure is disposed on the rear end of the heat radiator, and thus, the design and layout of other parts of the module cannot be affected; moreover, the dimming system 5 is compact in overall structure and small in space occupation, and the size of the module in the up-down and left-right directions is basically not increased, so that the overall design of the vehicle headlamp cannot be affected, and a wider design space is brought for the design of the vehicle headlamp; and by disposing the left-right dimming screw 51 and the up-down dimming screw 53, the dimming screws can be rotated to drive the heat radiator to rotate left and right or up and down, thereby driving the overall module to rotate left and right or up and down to achieve the left-right and up-down dimming of the module and convenience in dimming.

Specifically, the screw rod 513 of the left-right dimming screw 51 is in screwed fit with the support frame 54, the support frame 54 is provided with a screwed hole 543 cooperating with the screw rod 513 of the left-right dimming screw 51, the support frame 54 is slidably mounted on the fixed frame 52, one of the fixed frame 52 and the support frame 54 is provided with a sliding block 522 in the left-right direction, and the other one is provided with a sliding chute 542 cooperating with the sliding block 522. As shown in FIG. 24 to FIG. 26, FIG. 36, and FIG. 37, the fixed frame 52 is provided with the sliding block 522 in the left-right direction, the support frame 54 is provided with the sliding chute 542 cooperating with the sliding block 522, the left-right dimming screw 51 is rotated, and the screw rod 513 of the left-right dimming screw 51 drives the support frame 54 to move left and right, i.e. drives the up-down dimming mechanism to move left and right. By disposing the sliding block 522 and the sliding chute 542, the support frame 54 can move left and right along the fixed frame 52, so that the support frame 54 left and right moves more smoothly, and it is more convenient and easier to perform left-right dimming.

Specifically, as shown in FIG. 20 to FIG. 26 and FIG. 32 to FIG. 34, the heat radiator is provided with a first heat radiation fin 61, left and right sides of the screwed connector 55 are fixed to the first heat radiation fin 61, and a gap 551 is disposed between each of front and rear sides of the screwed connector 55 and the first heat radiation fin 61. Specifically, through slots 552 passing through the front and rear sides of the screwed connector 55 are formed in the left and right sides of the screwed connector 55, the first heat radiation fin 61 is provided with a mounting hole, the screwed connector 55 is inserted into the mounting hole and is clamped on left and right side walls of the mounting hole by the through slots 552, and the gap 551 is formed between each of the front and rear sides of the screwed connector 55 and each of the front and rear side walls of the mounting hole. Since the up-down dimming screw 53 cannot move up and down, when the up-down dimming screw 53 is rotated, a screw rod 533 of the up-down dimming screw 53 can drive the screwed connector 55 to move up and down, and the screwed connector 55 is clamped on the first heat radiation fin 61 to further drive the heat radiator to move up and down, so that the heat radiator rotates around the up-down dimming axis 620 to perform up-down dimming. In addition, during left-right dimming, the left-right dimming screw 51 drives the support frame 54 to move left and right, the screwed connector 55 also moves left and right and linearly with the support frame 54, the heat radiator rotates around the left-right dimming axis 560 along an arc line, and therefore, the heat radiator has a motion component with respect to the screwed connector 55 in a back-and-forth direction; and if the front, rear, left and right of the screwed connector 55 are fixed together with the heat radiator, the heat radiator cannot rotate, and therefore, left and right sides of the screwed connector 55 are fixed to the first heat radiation fin 61, there is the gap 551 between each of the front and rear sides of the screwed connector 55 and the first heat radiation fin 61, and there is no contact, so that the heat radiator can better rotate. Of course, the left and right sides of the screwed connector 55 can also be fixed to the first heat radiation fin 61 by other structures. For example, clamping blocks are disposed on the left and right sides of the screwed connector 55, clamping slots are disposed in the left and right side walls of the mounting hole, the screwed connector 55 is clamped in the clamping slots by the clamping blocks so as to be fixed to the first heat radiation fin 61, which also falls within the protection scope of the present disclosure. In addition, the screwed connector 55 is provided with a screwed hole, and each of the front and rear sides of the screwed connector 55 is provided with an opening communicating with the screwed hole, so that the screwed connector 55 easily deforms to be conveniently inserted into the mounting hole in the first heat radiation fin 61, thereby being clamped with the first heat radiation fin 61.

Figure 24:
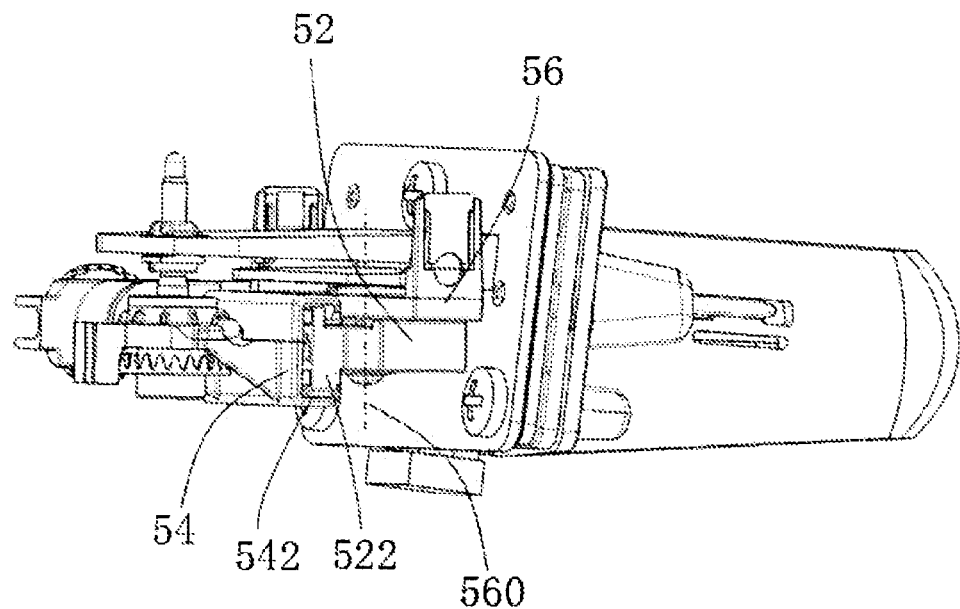
FIG. 24 is a fourth schematic structural view of a dimming system in another embodiment of the present disclosure.
Figure 25:
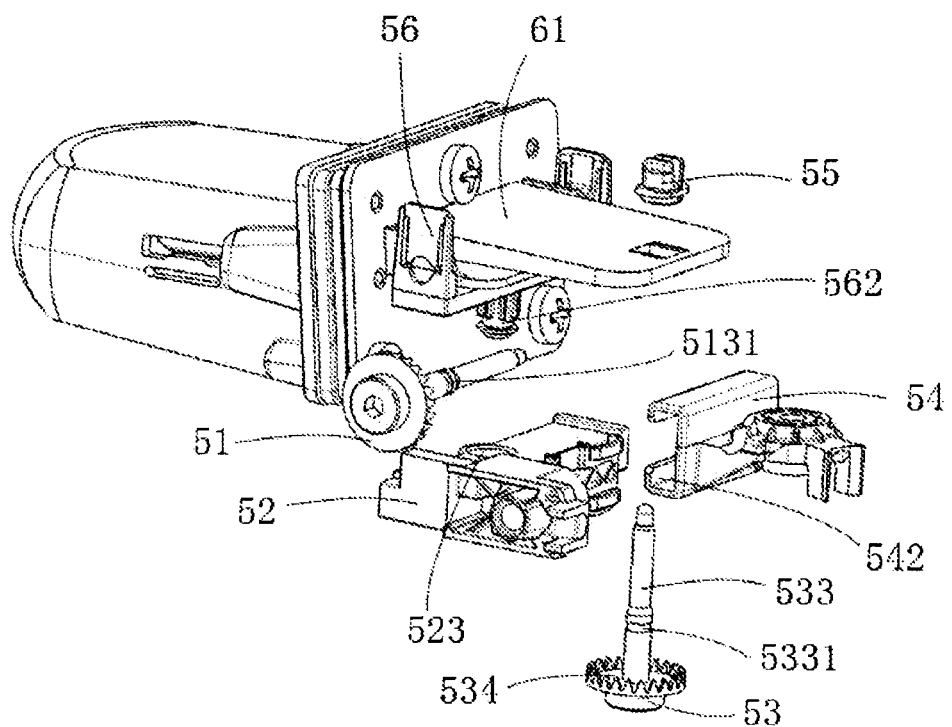
FIG. 25 is an exploded view of a dimming system in another embodiment of the present disclosure.
Figure 26:
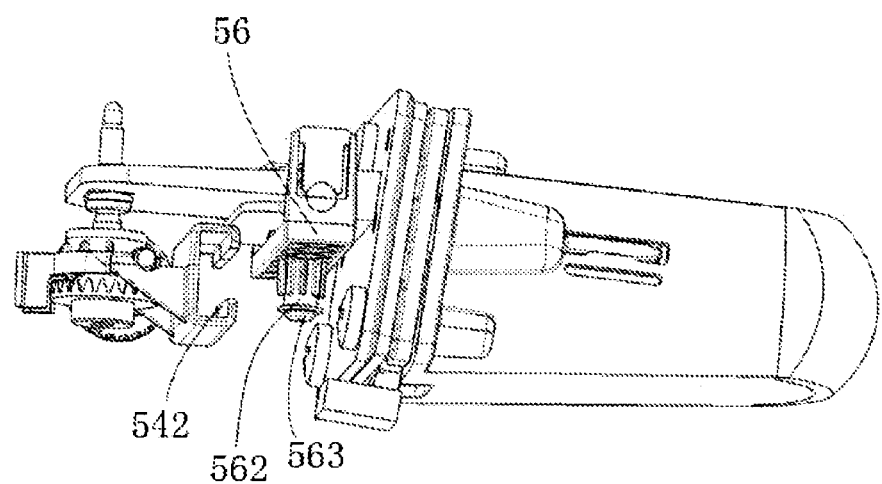
FIG. 26 is a schematic structural view of a dimming system without a fixed frame in another embodiment of the present disclosure.

Specifically, as shown in FIG. 24 and FIG. 25, the dimming system 5 further includes a rotating frame 56, the rotating frame 56 is provided with a rotating shaft disposed in a up-down direction, the fixed frame 52 is provided with a through hole 523 cooperating with the rotating shaft, the left-right dimming axis 560 is a central axis of the rotating shaft, and the heat radiator is suitable for driving the rotating frame 56 to move left and right, so that the rotating frame 56 drives the heat radiator to rotate around the left-right dimming axis 560. Preferably, as shown in FIG. 25 to FIG. 27 and FIG. 29 to FIG. 31, the rotating shaft is a screw stud 562 which is mounted in the through hole 523 by a screw 563, thereby avoiding the situation that the screw stud 562 comes out of the through hole 523 of the fixed frame 52, and facilitating mounting and positioning the rotating frame 56 on the fixed frame 52. More preferably, a plurality of ribs 5621 in linear contact with the through hole 523 are disposed an outer surface of the screw stud 562 to ensure that a central axis of the screw stud 562 coincides with a central axis of the through hole 523, so that the screw stud 562 can better rotate in the through hole 523 around its central axis.

Figure 23:
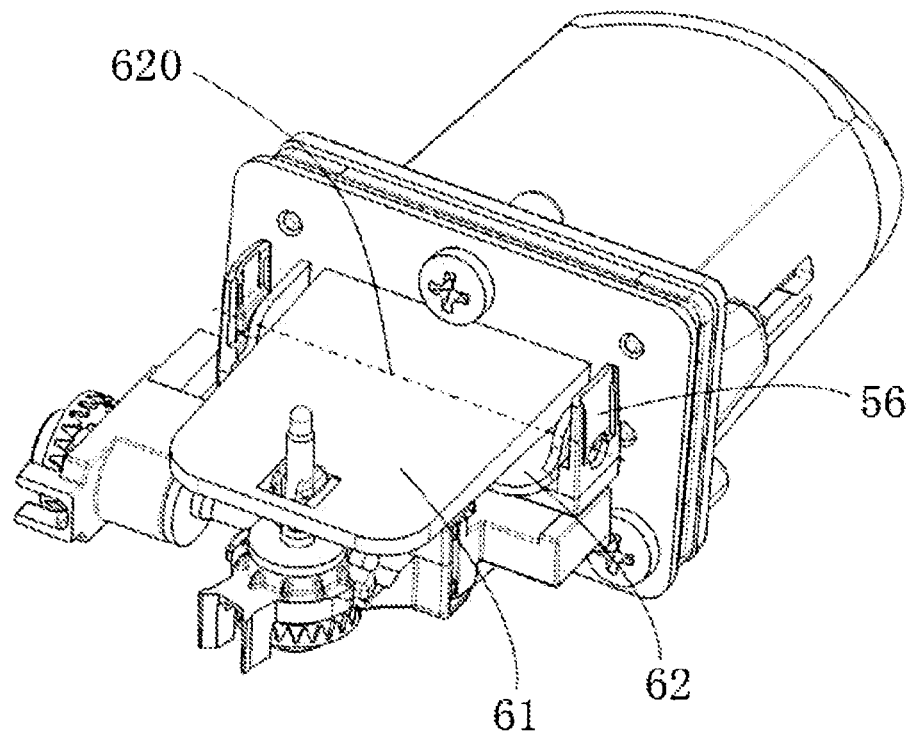
FIG. 23 is a third schematic structural view of a dimming system in another embodiment of the present disclosure.
Figure 29:
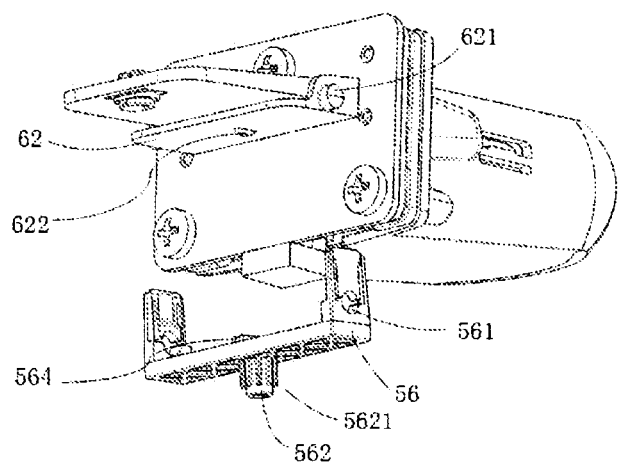
FIG. 29 is a schematic view of an exploded structure of a rotating frame of a dimming system and the heat radiator in another embodiment of the present disclosure.
Figure 30:
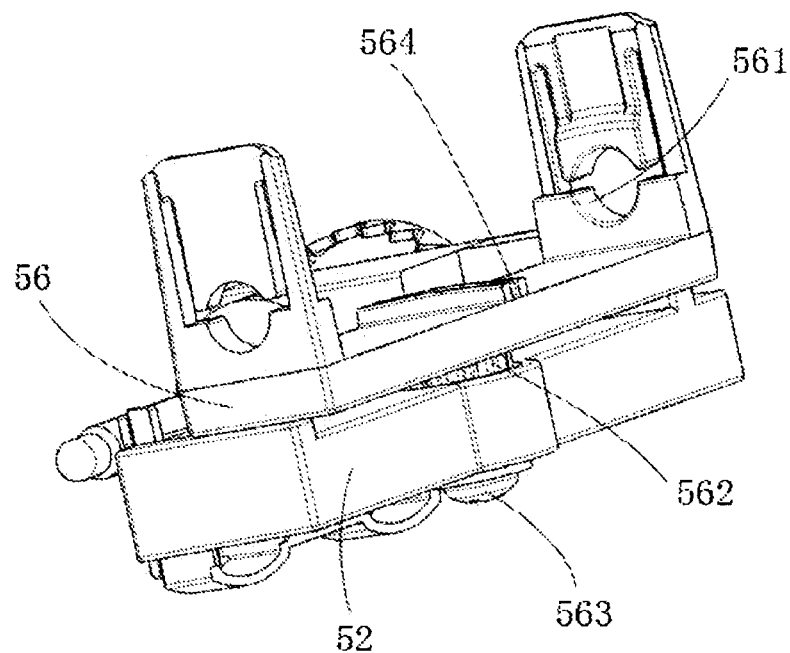
FIG. 30 is a schematic view of a connecting structure between a rotating frame and a fixed frame of a dimming system in another embodiment of the present disclosure.
Figure 31:
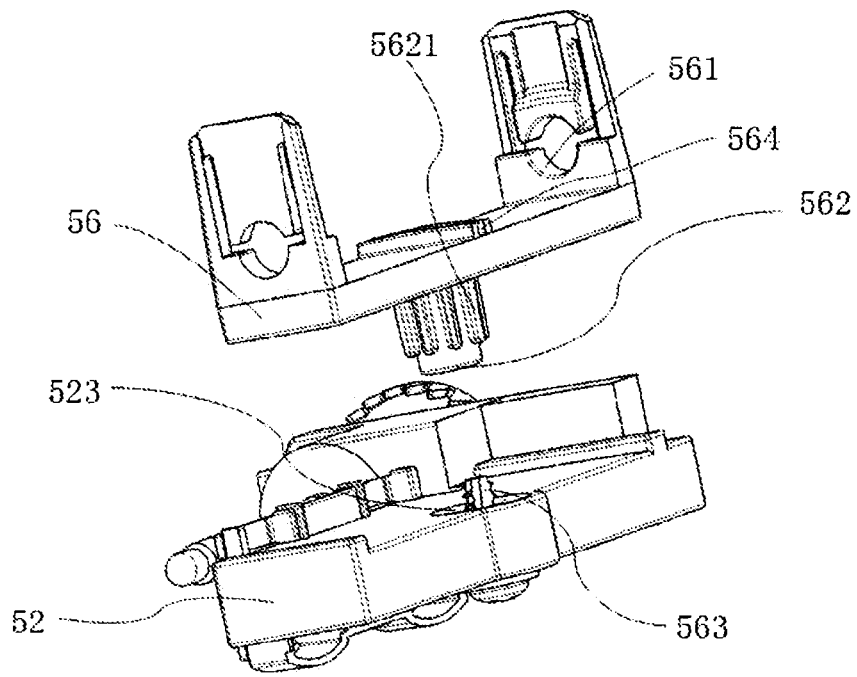
FIG. 31 is a schematic view of an exploded structure of a rotating frame and a fixed frame of a dimming system in another embodiment of the present disclosure.
Figure 32:
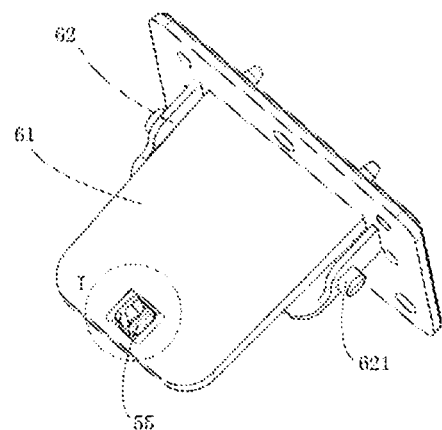
FIG. 32 is a schematic view of a connecting structure between a screwed connector of a dimming system and a heat radiator in another embodiment of the present disclosure.
Figure 33:
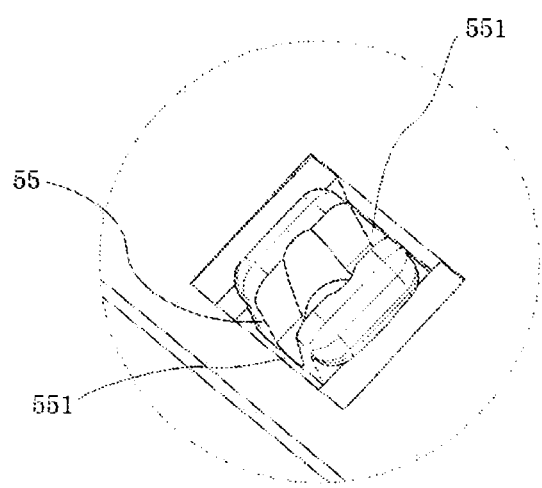
FIG. 33 is a schematic view of an enlarged structure of a part I in FIG. 32.
Figure 34:
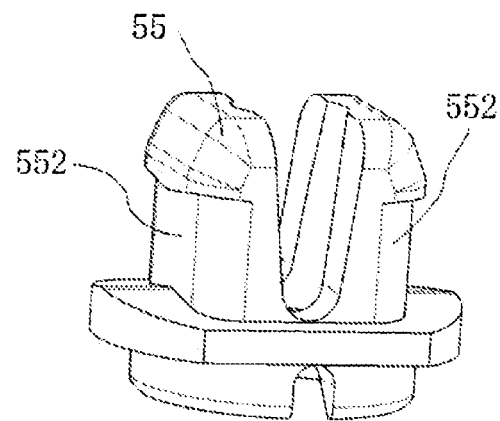
FIG. 34 is a schematic structural view of a screwed connector of a dimming system in another embodiment of the present disclosure.
Figure 35:
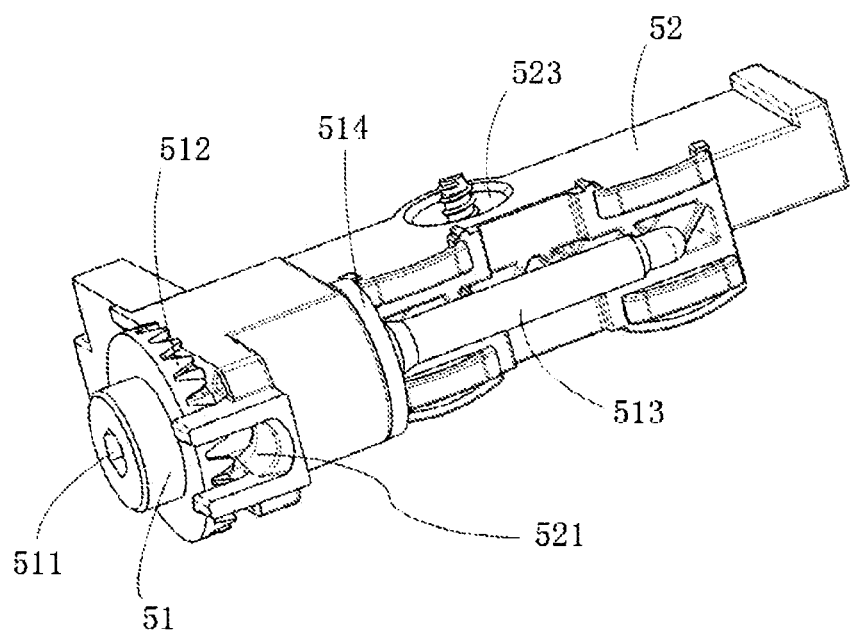
FIG. 35 is a first schematic structural view of a left-right dimming mechanism of a dimming system in another embodiment of the present disclosure.
Figure 36:
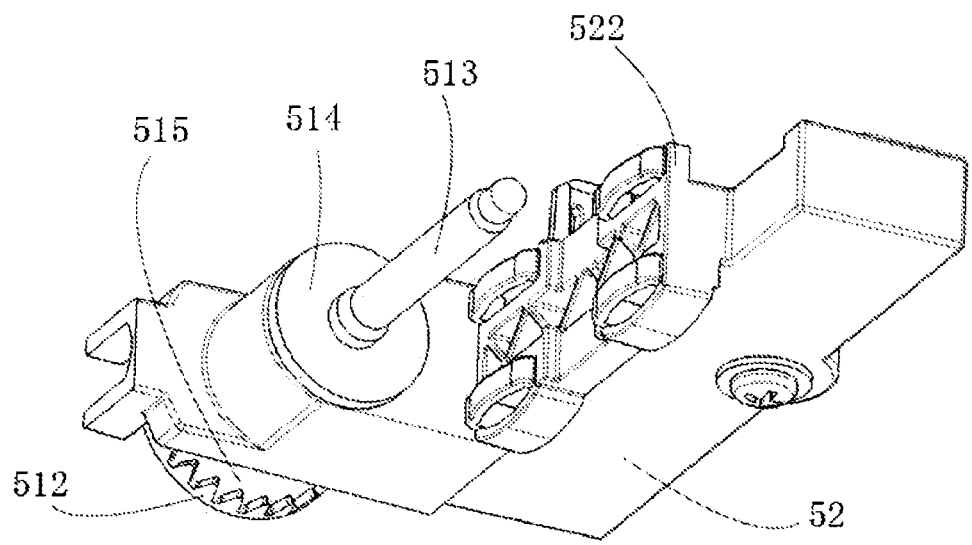
FIG. 36 is a second schematic structural view of a left-right dimming mechanism of a dimming system in another embodiment of the present disclosure.
Figure 37:
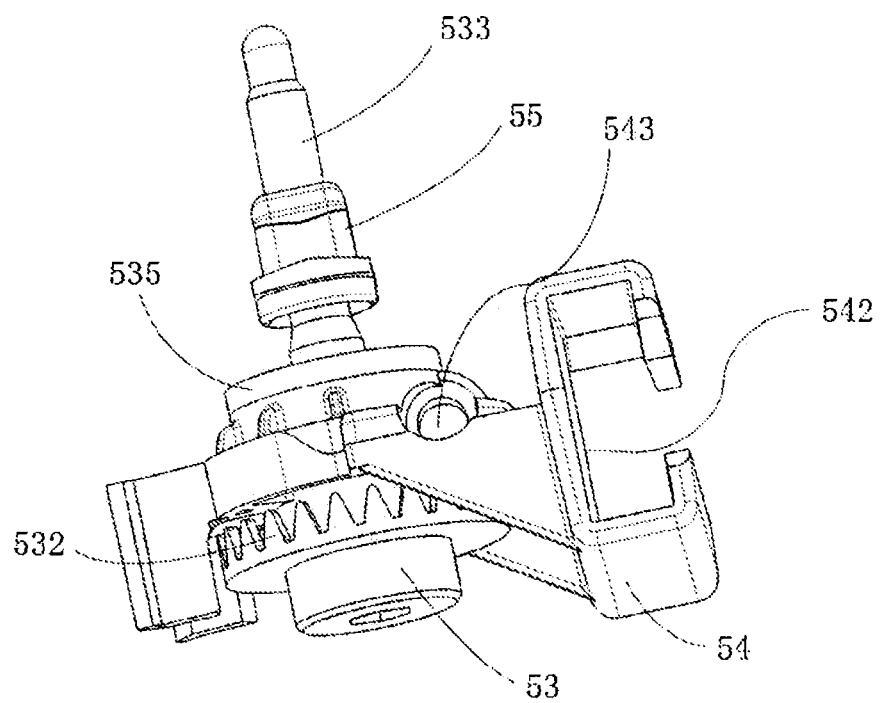
FIG. 37 is a schematic structural view of a up-down dimming mechanism of a dimming system in another embodiment of the present disclosure.

Specifically, as shown in FIG. 23, FIG. 29 and FIG. 32, the heat radiator is provided with a second heat radiation fin 62, left and right sides of the second heat radiation fin 62 are respectively provided with coaxial cylindrical convex blocks 621, left and right ends of the rotating frame 56 are respectively provided with circular holes 561 cooperating with the cylindrical convex blocks 621 on corresponding sides, and the up-down dimming axis 620 is a central axis of the coaxial cylindrical convex blocks 621. During up-down dimming, the up-down dimming screw 53 is rotated, and the screw rod 533 of the up-down dimming screw 53 drives the heat radiator to move up and down. Since the fixed frame 52 is connected to the rotating frame 56, the rotating frame 56 is connected to the second heat radiation fin 62, and the fixed frame 52 limits the up-down motion of the heat radiator, so that the cylindrical convex blocks 621 on the left and right sides of the second second heat radiation fin 62 rotate in the circular holes 561 around their central axis, that is, the heat radiator rotates around the up-down dimming axis 620, thereby achieving up-down dimming.

Figure 27:
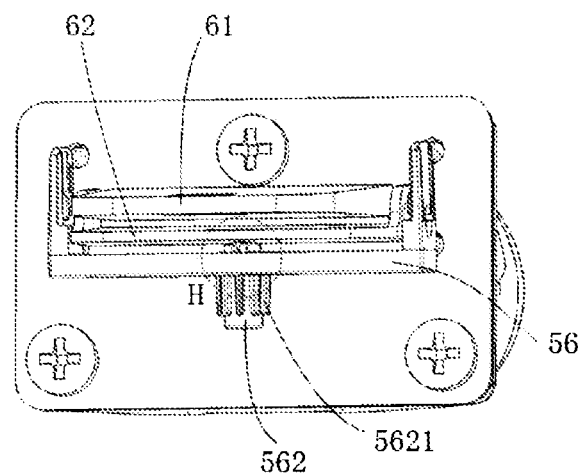
FIG. 27 is a schematic view of a connecting structure between a rotating frame of a dimming system and a heat radiator in another embodiment of the present disclosure.
Figure 28:
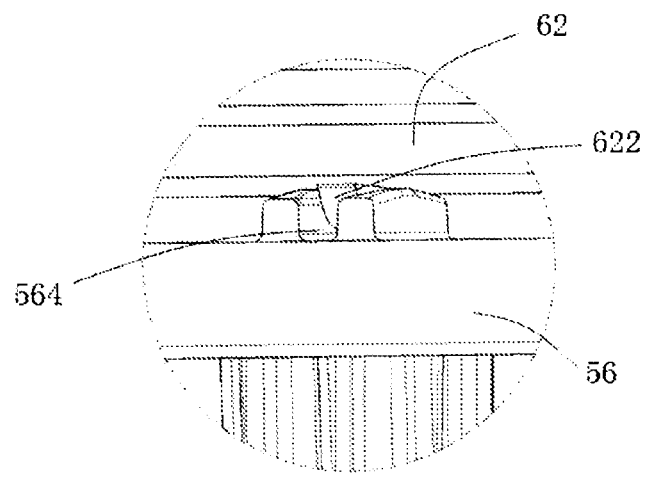
FIG. 28 is a schematic view of an enlarged structure of a part H in FIG. 27.

Further, one of the second heat radiation fin 62 and the rotating frame 56 is provided with a convex block 622, and the other one is provided with a groove 564 cooperating with the convex block 622, so that the heat radiator and the rotating frame 56 are capable of synchronously rotating and moving in the left-right direction. As shown in FIG. 27 to FIG. 29, the second heat radiation fin 62 is provided with the convex block 622 extending in a back-and-forth direction, and the rotating frame 56 is provided with the groove 564 cooperating with the convex block 622 and extending in the back-and-forth direction. During left-right dimming, the left-right dimming screw 51 is rotated, the screw rod 513 of the left-right dimming screw 51 drives the up-down dimming mechanism to move left and right, the up-down dimming screw 53 of the up-down dimming mechanism drives the heat radiator to move horizontally, and the convex block 622 on the second heat radiation fin 62 drives the groove 564 to further drive the rotating frame 56 to move left and right and synchronously. The rotating frame 56 is provided with the rotating shaft in the up-down direction, the fixed frame 52 is provided with the through hole 523 cooperating with the rotating shaft, and the fixed frame 52 limits the left-right motion of the rotating frame 56, so that the rotating frame 56 rotates around the left-right dimming axis 560, and the groove 564 in the rotating frame 56 drives the convex block 622 to further drive the heat radiator to synchronously rotate around the left-right dimming axis 560, thereby achieving left-right dimming.

Figure 38:
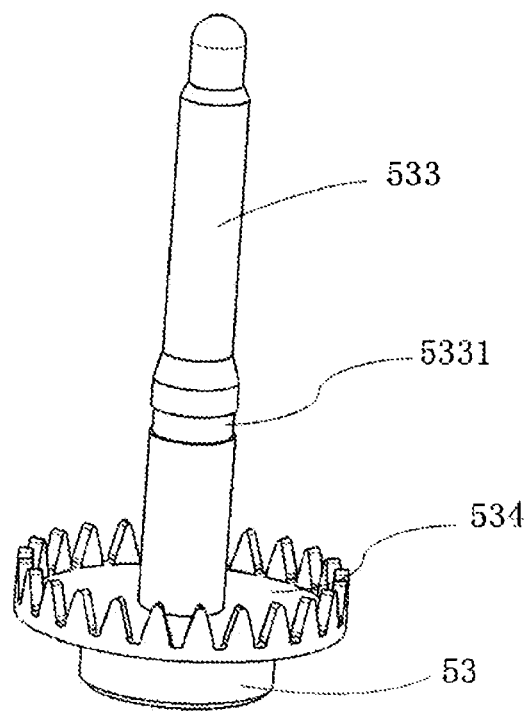
FIG. 38 is a schematic structural view of a up-down dimming screw of a dimming system in another embodiment of the present disclosure.

Of course, it is also possible that the second heat radiation fin 62 is not disposed, the left and right sides of the first heat radiation fin 61 are respectively provided with the coaxial cylindrical convex blocks 621, and the first heat radiation fin 61 is provided with a convex block 622 extending in the back-and-forth direction so as to cooperate with the rotating frame 56, and thus, up-down and left-right dimming can also be achieved. Furthermore, it is also possible that the rotating frame 56 is not disposed, left and right ends of the fixed frame 52 are respectively provided with the circular holes 561 cooperating with the cylindrical convex blocks 621 on the corresponding sides, the first heat radiation fin 61 is provided with the rotating shaft in the up-down direction, the fixed frame 52 is provided with the through hole 523 cooperating with the rotating shaft, and thus, the up-down and left-right dimming can also be achieved. These modifications also fall within the protection scope of the present disclosure.

to FIG. 38, a screw head of each of the left-right dimming screw 51 and the up-down dimming screw 53 is provided with a limiting surface, the screw rod of each of the left-right dimming screw 51 and the up-down dimming screw 53 is provided with a clamping slot, the left-right dimming screw 51 is mounted on the fixed frame 52 by the limiting surface 515 of the left-right dimming screw 51 and a check washer 514 mounted in the clamping slot 5131 of the left-right dimming screw 51 so that the left-right dimming screw 51 can rotate on the fixed frame 52 and cannot move in the left-right direction, and the up-down dimming screw 53 is mounted on the support frame 54 by the limiting surface 534 of the up-down dimming screw 53 and a check washer 535 mounted in the clamping slot 5331 of the up-down dimming screw 53 so that the up-down dimming screw 53 can rotate on the support frame 54 and cannot move in the up-down direction.

Preferably, as shown in FIG. 20, FIG. 21, FIG. 25, FIG. 35 and FIG. 37, a screw head of the left-right dimming screw 51 is provided with a left-right dimming tool inserting hole 511, a dimming tool is inserted into the left-right dimming tool inserting hole 511, and the dimming tool is rotated to drive the left-right dimming screw 51 to rotate; and a screw head of the up-down dimming screw 53 is provided with a up-down dimming tool inserting hole 531, the dimming tool is inserted into the up-down dimming tool inserting hole 531, and the dimming tool is rotated to drive the up-down dimming screw 53 to rotate. Each of the dimming tool inserting holes may be a polygonal hole such as a hexagonal hole or a strip-shaped hole or a cross hole; the dimming tool may be a screwdriver cooperating with the dimming tool inserting holes; and the screwdriver is inserted into the dimming tool inserting holes, the screwdriver is rotated to drive the left-right dimming screw 51 and the up-down dimming screw 53 to rotate.

an outer ring of a screw head of the left-right dimming screw 51 is provided with a left-right dimming gear 512, the fixed frame 52 is provided with a left-right dimming tool guide sleeve 521, a dimming tool is inserted into the left-right dimming tool guide sleeve 521, and then, the left-right dimming gear 512 is toggled to drive the left-right dimming screw 51 to rotate; and an outer ring of a screw head of the up-down dimming screw 53 is provided with a up-down dimming gear 532, the support frame 54 is provided with a up-down dimming tool guide sleeve 541, the dimming tool is inserted into the up-down dimming tool guide sleeve 541, and then, the up-down dimming gear 532 is toggled to drive the up-down dimming screw 53 to rotate. By disposing the dimming tool guide sleeves, it is convenient to insert the dimming tool, so that the dimming gears can be better toggled to rotate. The dimming tool may be a screwdriver cooperating with the dimming gears, and a head of the screwdriver is meshed with the dimming gears. The screwdriver is inserted into the dimming tool guide sleeves so as to be meshed with the dimming gears, and the screwdriver is rotated to drive the left-right dimming screw 51 and the up-down dimming screw 53 to rotate.

A second aspect of the present disclosure further provides a vehicle headlamp, including the above-mentioned vehicle headlamp optical system. By using the vehicle headlamp, the miniaturization and diversified design can be achieved.

A third aspect of the present disclosure further provides a vehicle, including the above-mentioned vehicle headlamp. The vehicle can achieve the diversified design and is beneficial to the improvement of the overall visual effect and aesthetic degree.

The preferred implementations of the present disclosure have been described in detail in conjunction with the accompanying drawings, however, the present disclosure is not limited to concrete details in the above-mentioned implementations. Various simple modifications may be made on the technical solutions of the present disclosure within the scope of the technical conception of the present disclosure, and these simple modifications fall within the protection scope of the present disclosure.

In addition, it should be noted that all the specific technical features described in the above-mentioned specific implementations may be combined in any proper way without conflicts. In order to avoid unnecessary repetition, various possible combination ways are no longer described additionally in the present disclosure.

Furthermore, various different implementations of the present disclosure may also be combined arbitrarily, and the combinations should also be regarded as contents disclosed by the present disclosure as long as they do not depart from the thought of the present disclosure.

The invention claimed is:

1. A vehicle headlamp optical system, comprising a plurality of modules and light distribution lenses that are disposed in fronts of all the modules; the plurality of modules comprising at least one high-beam module, at least one main low-beam module, and at least one auxiliary low-beam module; the light distribution lenses being narrow and long light distribution lenses; all the modules being disposed at intervals along the length directions of the light distribution lenses;

the high-beam module comprising a high-beam optical element and at least one high-beam light source, the high-beam optical element comprising a high-beam light transmission part and a light emitting part, at least one high-beam light converging part being disposed on a rear end of the high-beam light transmission part, the high-beam light converging part, the high-beam light transmission part and the light emitting part being sequentially connected and being integrally formed, the high-beam light converging part being in one-to-one correspondence to the high-beam light source, and rays emitted by the high-beam light source being converged by the high-beam light converging part and being then sequentially emitted by the high-beam light transmission part and the light emitting part to form a high-beam light shape;

the main low-beam module comprising a low-beam optical element and at least one low-beam light source, the low-beam optical element comprising an optical channel, the optical channel comprising a first optical channel and a second optical channel that are integrally formed, at least one low-beam light converging part being integrally formed on a rear end of the first optical channel, a low-beam light emitting surface being formed in a front end of the second optical channel, and the low-beam light converging part being in one-to-one correspondence to the low-beam light source; the low-beam light converging part and the first optical channel being both located above an optical axis of the low-beam light emitting surface, and an optical axis of the low-beam light converging part being obliquely disposed with respect to the optical axis of the low-beam light emitting surface; a reflecting part being formed on a lower surface of the first optical channel, a cut-off part being disposed on a position on which the reflecting part intersects with a rear end surface of the second optical channel, rays emitted by the low-beam light source sequentially passing through the first optical channel and the second optical channel after being converged by the low-beam light converging part, and being emitted by the low-beam light emitting surface to form a low-beam light shape; and the auxiliary low-beam module comprising an auxiliary low-beam primary optical element, a lens, and at least one auxiliary low-beam light source, the auxiliary low-beam primary optical element comprising an auxiliary low-beam light transmission part and at least one auxiliary low-beam light converging part, a rear end of the auxiliary low-beam light transmission part and the auxiliary low-beam light converging part being integrally formed, an auxiliary low-beam primary light emitting surface being formed on a front end of the auxiliary low-beam light transmission part, the auxiliary low-beam light converging part being in one-to-one correspondence to the auxiliary low-beam light source, rays emitted by the auxiliary low-beam light source being irradiated onto the auxiliary low-beam light transmission part after being converged by the auxiliary low-beam light converging part, being irradiated onto the lens after being emitted by the auxiliary low-beam primary light emitting surface, and being refracted by the lens to form an auxiliary low-beam light shape.

2. The vehicle headlamp optical system according to claim 1, wherein the high-beam light converging part is of a protruding structure protruding backwards; the low-beam light converging part is of a light converging cup structure, an external contour surface of the low-beam light converging part is a curved surface of which a caliber is gradually increased from back to front, or the low-beam light converging part is of a protruding structure protruding backwards; and the auxiliary low-beam light converging part is of a light converging cup structure, an external contour surface of the auxiliary low-beam light converging part is a curved surface of which a caliber is gradually increased from back to front, or the auxiliary low-beam light converging part is of a protruding structure protruding backwards.

3. The vehicle headlamp optical system according to claim 1, wherein the lens is a plano-convex lens or a biconvex lens or an arc shaped lens, a longitudinal section of the arc-shaped lens is a plano-convex surface or a biconvex surface, and the arc-shaped lens is formed by rotating the longitudinal section with a vertical axis where a focus of the arc-shaped lens is located as a rotating shaft.

4. The vehicle headlamp optical system according to claim 1, wherein a III area structure is disposed on a lower surface of the auxiliary low-beam light transmission part, the III area structure is provided with a III area lower surface, and a III area light emitting surface is formed between the III area lower surface and the lower surface of the auxiliary low-beam light transmission part.

5. The vehicle headlamp optical system according to claim 1, wherein each of the modules comprises a heat radiator, and a dimming system is disposed on a rear end of the heat radiator of at least one of the modules.

6. The vehicle headlamp optical system according to claim 5, wherein the dimming system comprises a left-right dimming mechanism and a up-down dimming mechanism, the left-right dimming mechanism comprises a fixed frame and a left-right dimming screw disposed in a left-right direction, and the left-right dimming screw is rotatably mounted on the fixed frame; the up-down dimming mechanism comprises a support frame, a up-down dimming screw disposed in a up-down direction, and a screwed connector in screwed connection with the up-down dimming screw, the support frame is slidably mounted on the fixed frame and is in screwed connection with a screw rod of the left-right dimming screw, the up-down dimming screw is rotatably mounted on the support frame, and the screwed connector is fixed to the heat radiator;

the up-down dimming screw is rotated, and the screwed connector moves up and down to drive the heat radiator to move up and down, so that the heat radiator rotates around a up-down dimming axis to perform up-down dimming; and the left-right dimming screw is rotated, the up-down dimming mechanism moves left and right, and the up-down dimming screw of the up-down dimming mechanism drives the heat radiator to move left and right, so that the heat radiator rotates around a left-right dimming axis to perform left-right dimming.

7. The vehicle headlamp optical system according to claim 6, wherein one of the fixed frame and the support frame is provided with a sliding block in the left-right direction, and the other one is provided with a sliding chute cooperating with the sliding block.

8. The vehicle headlamp optical system according to claim 6, wherein the heat radiator is provided with a first heat radiation fin, left and right sides of the screwed connector are fixed to the first heat radiation fin, and a gap is disposed between each of front and rear sides of the screwed connector and the first heat radiation fin.

9. The vehicle headlamp optical system according to claim 6, wherein the dimming system further comprises a rotating frame, the rotating frame is provided with a rotating shaft disposed in a up-down direction, the fixed frame is provided with a through hole cooperating with the rotating shaft, the left-right dimming axis is a central axis of the rotating shaft, and the heat radiator is suitable for driving the rotating frame to move left and right, so that the rotating frame drives the heat radiator to rotate around the left-right dimming axis.

10. The vehicle headlamp optical system according to claim 9, wherein the heat radiator is provided with a second heat radiation fin, left and right sides of the second heat radiation fin are respectively provided with coaxial cylindrical convex blocks, left and right ends of the rotating frame are respectively provided with circular holes cooperating with the cylindrical convex blocks on corresponding sides, and the up-down dimming axis is a central axis of the coaxial cylindrical convex blocks.

11. The vehicle headlamp optical system according to claim 10, wherein one of the second heat radiation fin and the rotating frame is provided with a convex block, and the other one is provided with a groove cooperating with the convex block, so that the heat radiator and the rotating frame are capable of synchronously rotating and moving in the left-right direction.

12. The vehicle headlamp optical system according to claim 9, wherein the rotating shaft is a screw stud, the screw stud is mounted in the through hole by a screw, and a plurality of ribs in linear contact with the through hole are disposed on an outer surface of the screw stud.

13. The vehicle headlamp optical system according to claim 6, wherein a screw head of each of the left-right dimming screw and the up-down dimming screw is provided with a limiting surface, the screw rod of each of the left-right dimming screw and the up-down dimming screw is provided with a clamping slot, the left-right dimming screw is mounted on the fixed frame by the limiting surface of the left-right dimming screw and a check washer mounted in the clamping slot of the left-right dimming screw, and the up-down dimming screw is mounted on the support frame by the limiting surface of the up-down dimming screw and a check washer mounted in the clamping slot of the up-down dimming screw.

14. The vehicle headlamp optical system according to claim 6, wherein a screw head of each of the left-right dimming screw and the up-down dimming screw is provided with a dimming tool inserting hole, so that a dimming tool is inserted to drive the left-right dimming screw and the up-down dimming screw to rotate.

15. The vehicle headlamp optical system according to claim 6, wherein an outer ring of a screw head of each of the left-right dimming screw and the up-down dimming screw is provided with a dimming gear, and each of the fixed frame and the support frame is provided with a dimming tool guide sleeve, so that a dimming tool is inserted and used to toggle the dimming gear to drive the left-right dimming screw and the up-down dimming screw to rotate.

16. A vehicle headlamp, comprising the vehicle headlamp optical system according to claim 1.

17. The vehicle headlamp according to claim 16, wherein the high-beam light converging part is of a protruding structure protruding backwards; the low-beam light converging part is of a light converging cup structure, an external contour surface of the low-beam light converging part is a curved surface of which a caliber is gradually increased from back to front, or the low-beam light converging part is of a protruding structure protruding backwards; and the auxiliary low-beam light converging part is of a light converging cup structure, an external contour surface of the auxiliary low-beam light converging part is a curved surface of which a caliber is gradually increased from back to front, or the auxiliary low-beam light converging part is of a protruding structure protruding backwards.

18. The vehicle headlamp according to claim 16, wherein the lens is a plano-convex lens or a biconvex lens or an arc-shaped lens, a longitudinal section of the arc-shaped lens is a plano-convex surface or a biconvex surface, and the arc-shaped lens is formed by rotating the longitudinal section with a vertical axis where a focus of the arc-shaped lens is located as a rotating shaft.

19. The vehicle headlamp according to claim 16, wherein a III area structure is disposed on a lower surface of the auxiliary low-beam light transmission part, the III area structure is provided with a III area lower surface, and a III area light emitting surface is formed between the III area lower surface and the lower surface of the auxiliary low-beam light transmission part.

20. The vehicle headlamp according to claim 16, wherein each of the modules comprises a heat radiator, and a dimming system is disposed on a rear end of the heat radiator of at least one of the modules.

* * * * *